United States Patent [19]
Keith et al.

[11] Patent Number: 5,366,405
[45] Date of Patent: Nov. 22, 1994

[54] SEMI-AUTOMATIC SHRIMP PEELING MACHINE

[75] Inventors: Jon T. Keith, Wheeling; E. Douglas Betts, Libertyville; Michael J. Dancy, Vernon Hills; James E. Pershinske, McHenry, all of Ill.

[73] Assignee: Gregor Jonsson, Inc., Highland Park, Ill.

[21] Appl. No.: 30,827

[22] Filed: Mar. 12, 1993

Related U.S. Application Data

[63] Continuation-in-part of Ser. No. 944,834, Sep. 14, 1992, abandoned.

[51] Int. Cl.⁵ ............................................. A22C 29/02
[52] U.S. Cl. ................................. 452/5; 452/2; 452/180
[58] Field of Search ........................ 452/5, 2, 3, 180

[56] References Cited

U.S. PATENT DOCUMENTS

| | | | |
|---|---|---|---|
| Re. 24,115 | 1/1956 | Miller | 452/5 |
| 3,159,871 | 12/1964 | Jonsson | 452/3 |
| 3,696,466 | 10/1972 | Letchworth | 452/2 |
| 3,751,766 | 8/1973 | Jonsson | 17/71 |
| 4,121,322 | 10/1978 | Rutledge | 452/5 |
| 4,281,436 | 8/1981 | Hoffman et al. | 17/72 |
| 4,439,893 | 4/1984 | Betts | 17/72 |
| 4,507,825 | 4/1985 | Betts | 17/73 |
| 4,745,660 | 5/1988 | Betts | 17/73 |
| 4,769,871 | 9/1988 | Betts | 17/48 |

FOREIGN PATENT DOCUMENTS 125012  1/1959  U.S.S.R. ............................. 452/180

OTHER PUBLICATIONS

Article from "Design News" dated Jul. 20, 1992 entitled How PLCs Change With The Times by Terrence Lynch, pp. 69–70, 72.

*Primary Examiner*—Willis Little
*Attorney, Agent, or Firm*—Marshall, O'Toole, Gerstein, Murray & Borun

[57] ABSTRACT

A feed device for a shrimp peeling machine in which a shrimp is delivered in a feed conveyor means to a shrimp clamp assembly located on a rotatable transport wheel and the feed conveyor is longitudinally aligned with the longitudinal axis of the clamp assembly. Means also are provided for synchronizing the drop off of a shrimp from the conveying means to a clamp assembly. The shrimp peeling machine also includes a hold-down wheel for assisting the clamping of shrimp in a clamp assembly, a dual brush deveining assembly and a shrimp meat removal device.

52 Claims, 21 Drawing Sheets

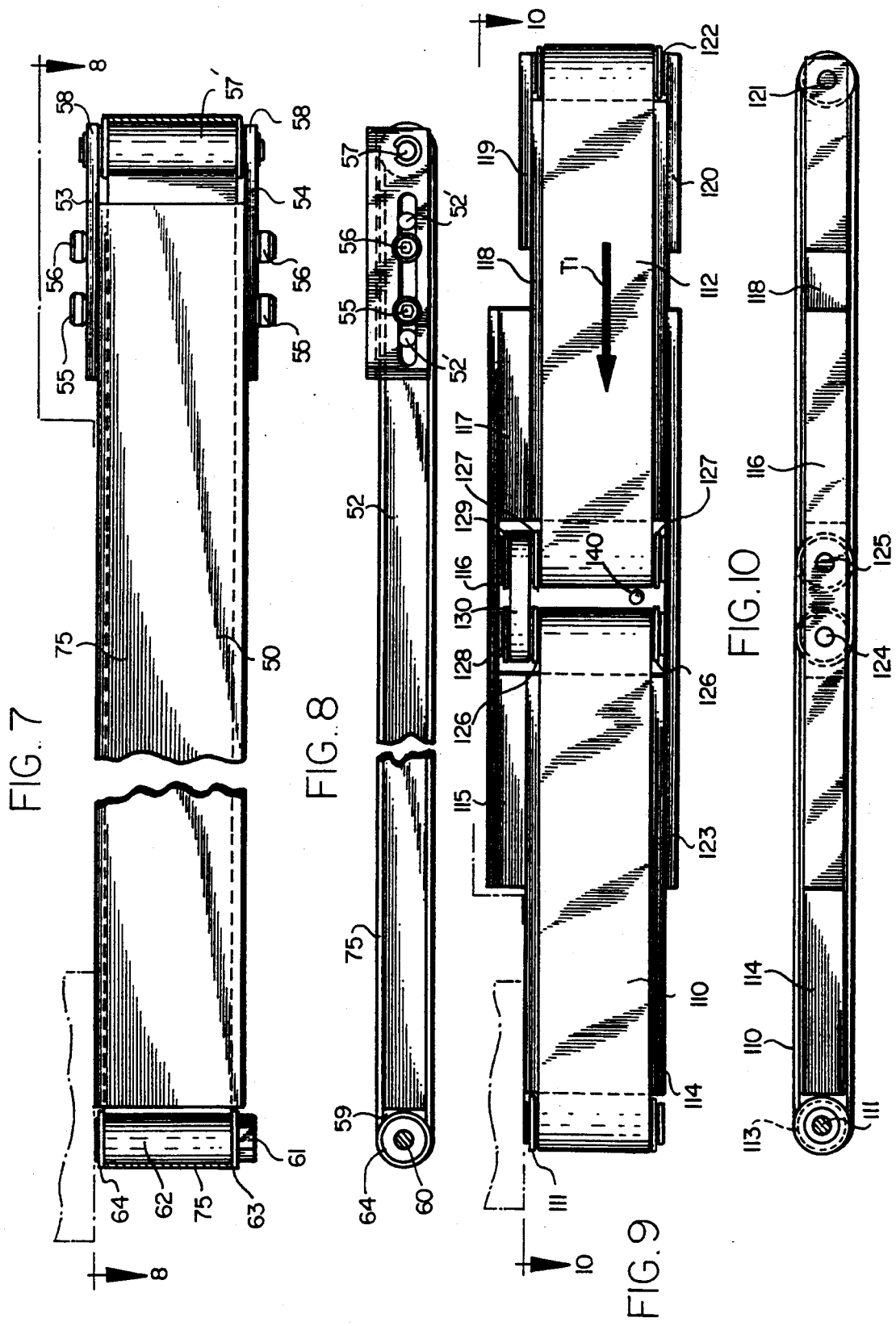

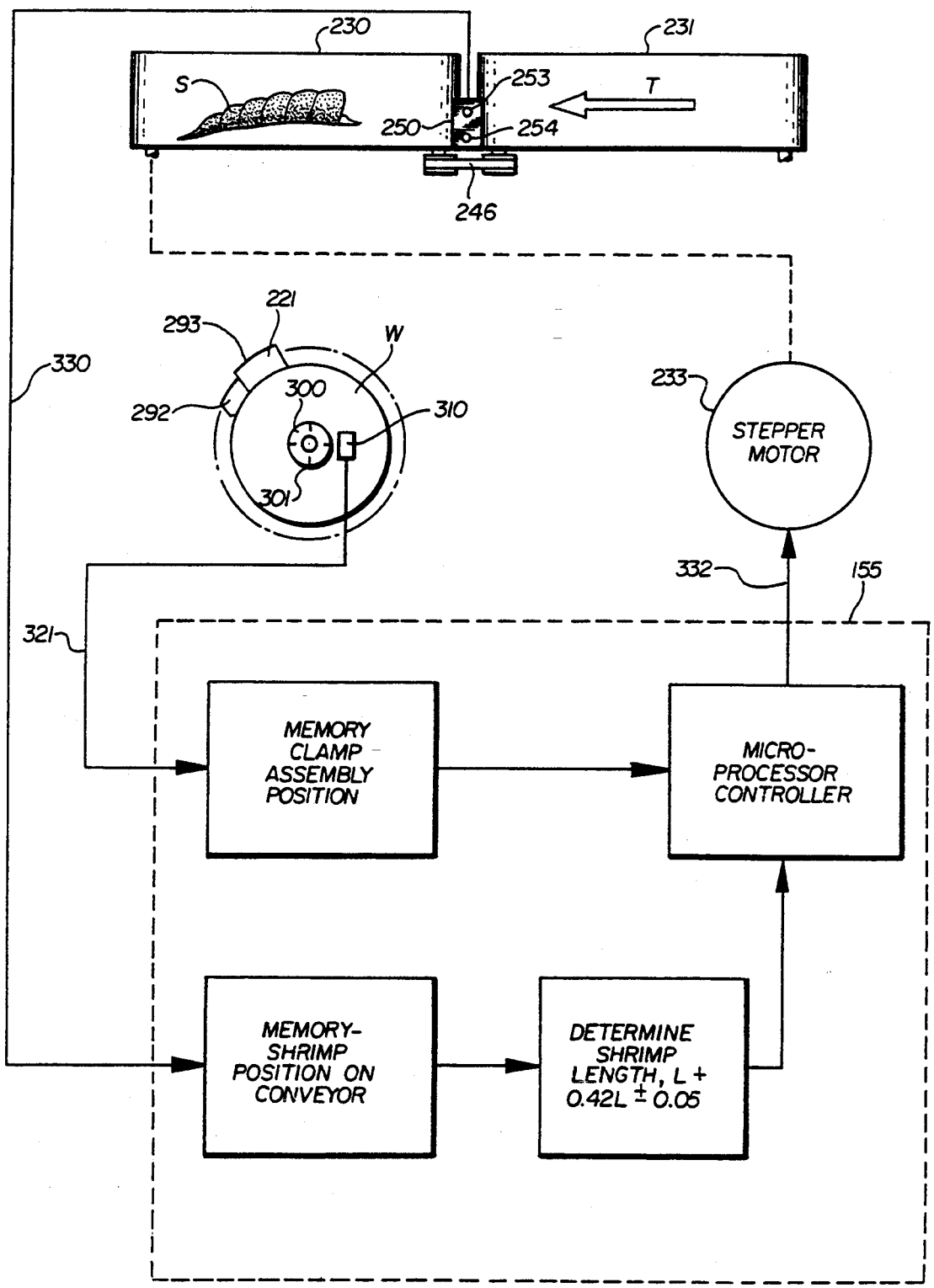

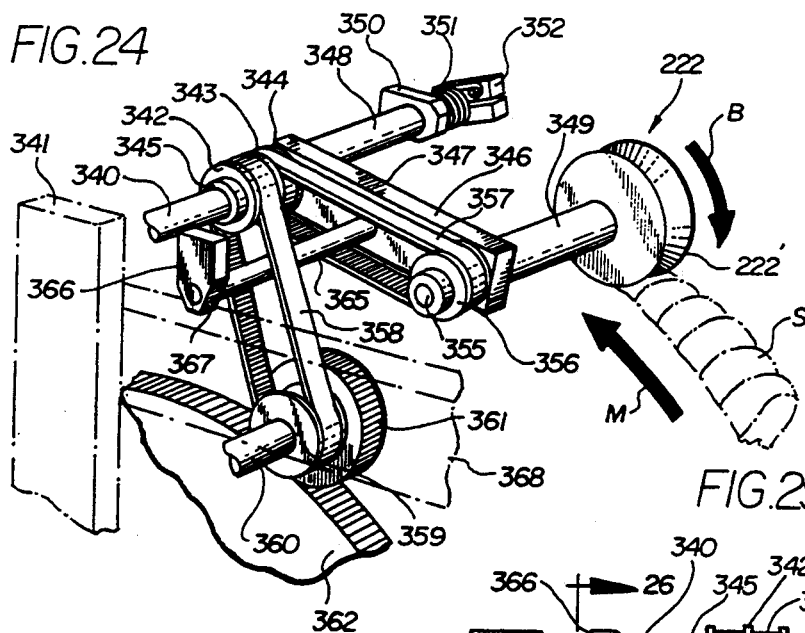
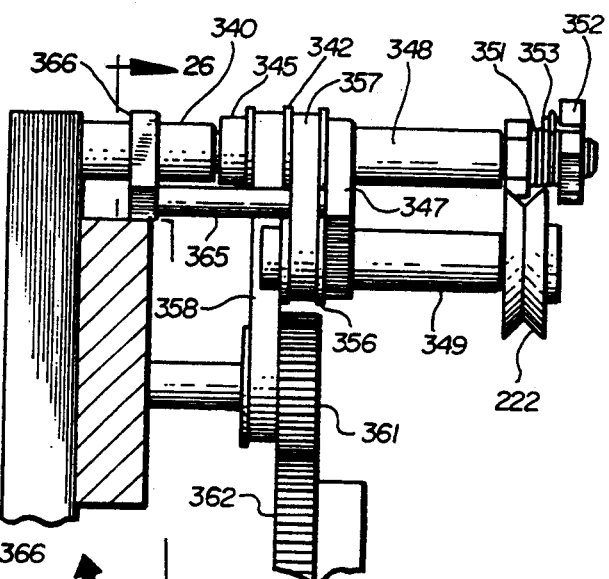
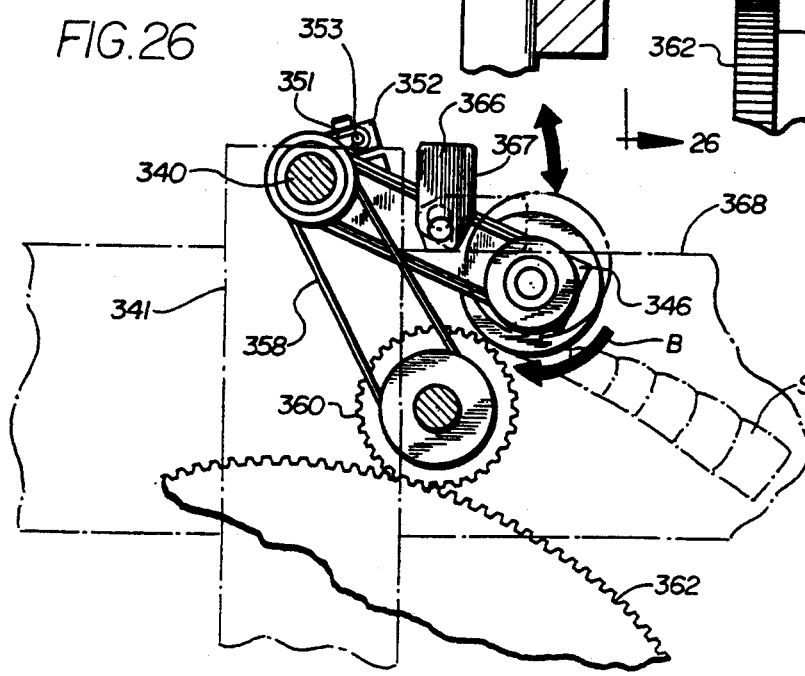

SEMI-AUTOMATIC SHRIMP PEELING MACHINE

This application is a continuation-in-part application of patent application Ser. No. 07/944,834, filed Sep. 14, 1992 and entitled "Semi-Automatic Shrimp Peeling Machine," inventor, Jon T. Keith now abandoned.

FIELD OF INVENTION

The invention disclosed and claimed herein relates to a shrimp peeling machine in which the shrimp shell is removed from a shrimp and the shrimp is deveined. More particularly, the present invention is directed to an improved feed system for feeding shrimp to an automatic shrimp peeling machine and an improved shrimp peeling system where a shrimp is cut, deveined and the shrimp meat removed from the shell.

BACKGROUND OF THE INVENTION

With conventional shrimp peeling systems presently available, an operator manually orients a shrimp on a moving feed tray by depositing the shrimp in a predetermined location on the tray. In some instances, over a period of a four to eight hour shift, operator attentiveness diminishes such that the operator does not position the shrimp on a feed tray properly. When a shrimp is not placed on a tray correctly, the shrimp will not always be transported properly to a clamp assembly located on a rotating shrimp transport wheel. As a result, a shrimp will not be in the desired position as it passes various work stations where, for example, the shrimp is cut, deveined, or the meat is removed. As a result, a shrimp will either be cut improperly such that it has to be re-worked to procure the desired end product, or the shrimp is destroyed.

Additionally, because of the need for an operator to properly position shrimp in the feed conveyor of a shrimp peeling machine, increased operating speeds with which shrimp can be fed to various work stations have not been obtainable.

Further, it has been found with various shrimp peeling machines presently available, that the shrimp must be fed at approximately 90° to the shrimp transport wheel which transports shrimp on the wheel past various work stations. Having the shrimp conveyor tray located 90° to the shrimp transport wheel requires that the shrimp peeling apparatus have substantially large machine width dimensions, which, unfortunately, includes a substantial amount of unwanted air space.

Additionally, it is desired that once shrimp have been properly fed to clamp assemblies on a rotating shrimp transport wheel, that the shrimp be properly cut, deveined and the meat removed from the shell. It has been found, in some instances, that the cutting, deveining and/or meat removal operations have not been entirely satisfactory. In some instances, the cutting of the shrimp meat is too coarse in that it appears that the shrimp has been cut with a saw-like blade. What is desired is to have a smooth, clean cut of the shrimp meat.

Similarly, at the deveining station where the shrimp vein is removed from the shell, it has been found that the vein removal has not been as complete, in all instances, as desired. What sometimes occurs is that the shrimp vein is not properly withdrawn from the shrimp which is undesirable in that the deveining operation will, in some cases, have to be repeated.

Further, at the station where the shrimp meat is removed from the shell, it has been found that, on some occasions, the shrimp is torn from the shell in somewhat of a rough pulling motion such that the meat is ripped from the shell as opposed to removing the meat from the shell in a more gentle manner as to avoid any undesired shredding or tearing of the shrimp meat.

What is desired is to have a feed system for a shrimp peeling machine in which shrimp can be fed to the peeling machine at rates substantially higher than feed rates presently available. Further, it is desired to obviate the need for an operator to properly position a shrimp in a conventional traveling feed tray, yet, at the same time, it is necessary that a shrimp will be properly positioned for transport to a rotating clamp assembly located on a shrimp transport wheel. It also is desired to provide a shrimp feed system where the shrimp are fed along a longitudinal axis which is substantially in line with the longitudinal axis of the shrimp clamp assemblies positioned on a transport wheel.

It is further desired that once the shrimp has been properly fed to the rotating shrimp transport wheel, that the shrimp shell and meat be uniformly and smoothly cut. Further, it is important that the shrimp vein be removed uniformly from the shrimp shell. It also is desired to remove the shrimp meat from the shell to avoid tearing or shredding the shrimp as it is pulled away from the shell, the adverse effect being that the physical appearance of the shrimp meat is diminished with the attendant disadvantage that the commercial value of the shrimp can be diminished.

Finally, it is desired to improve the frame construction of the shrimp peeling machine so that when the frame support is assembled together, the various frame members are properly aligned and that the frame support will not become misaligned during shipment or subsequent use of the device.

SUMMARY OF THE PRESENT INVENTION

The invention disclosed and claimed herein serves to obviate or otherwise eliminate disadvantages which sometimes occur with conventional shrimp peeling machines while at the same time achieving the desires sought for a shrimp peeling machine feed device. The present invention serves to increase shrimp loading accuracy and improve shrimp peeling productivity.

Briefly, the present invention involves feeding shrimp to a plurality of spaced clamp assemblies located on a rotating transport wheel which transport shrimp to be processed past various work stations where the shrimp are deveined, cleaned and the shell and/or tail are removed such as shown in U.S. Pat. No. 4,439,893 issued Apr. 3, 1984; U.S. Pat. No. 4,745,660 issued May 24, 1988; U.S. Pat. No. 3,751,766 issued Aug. 14, 1973; U.S. Pat. No. 4,769,871 issued Sep. 13, 1988 and U.S. Pat. No. 4,507,825 issued Apr. 2, 1985, the entire disclosures and drawings of which are incorporated herein by reference.

Shrimp utilized with the feed system of the present invention are deposited in a narrow space formed by corresponding endless conveyor belts which are positioned to be substantially in line with the longitudinal axis of a clamp assembly attached to the shrimp transport wheel traveling at constant speed. The endless belts each travel at the same speed. Shrimp to be processed are fed by an operator to one end of the endless belts. The shrimp contact the moving belts and are directed along the length of the belts following which each shrimp is automatically transferred from the feed conveyors to a clamp assembly attached to a rotating shrimp transport wheel. The clamp assembly grasps both the shrimp tail and shrimp body following which the shrimp is transported to various work stations where various operations are performed on the shrimp.

The shrimp can be easily fed to the conveyor system by an operator and, it is expected, the shrimp feed rate can be increased to approximately 100 to 125 shrimp/minute as opposed to the approximate 67 shrimp/minute feed rate available with conventional shrimp peeling systems. The need for having an operator precisely deposit the shrimp at a particular location on a tray in a shrimp feed conveyor system is eliminated which serves, in part, to permit the shrimp feed rate to be increased. Another advantage to the feed system of the present invention is that operators will not require as much experience and training as heretofore required to locate a shrimp in a predetermined position on a tray. With the present invention, an operator does not require extensive training and experience to deposit the shrimp in the feed system. Rather, an operator will be more productive sooner than heretofore has occurred which is quite important inasmuch as the shrimp peeling industry has experienced a high turnover rate which dictates a significant period of time required for operator training.

As a shrimp travels along the conveyor system, sensor means serve to measure the length of the shrimp (L). In this instance, shrimp length is defined as that length extending from the tail end of a shrimp to the remaining portion of the shrimp, which is usually that portion of the shrimp which remains after the carapace or the shrimp head has been removed from the shrimp in a previous conventional operation, not pertinent to the invention disclosed and claimed herein. Once the shrimp length L is ascertained, a multiplier of 0.42 is applied to the length L. It has been found that the resulting value reflects the distance from the tail end of the shrimp to the location of the tail joint of the shrimp which is located at the interface of the shrimp tail segment (also known as shrimp abdomen segment(s)) and the remaining shrimp abdomen segments.

Contemporaneously, a second sensing means senses the location of a particular clamp assembly on the shrimp transport wheel which is rotating at a constant speed. The first and second sensing means values are fed to a microprocessor which is programmed to evaluate the position of the aforementioned tail joint of a shrimp on the endless conveyor relative to the location of a shrimp clamp assembly. That evaluation determines whether a shrimp will be deposited in the clamp assembly such that the shrimp tail section will be grasped precisely by the tail clamp of the clamp assembly while the shrimp body is grasped accurately by the shrimp body clamp of the clamp assembly.

In the event the microprocessor indicates that an adjustment of the position of the shrimp on the endless belts is required in order to assure that the shrimp will be properly positioned in order that it can be grasped properly by a shrimp clamp assembly, a signal command is passed by the microprocessor to a pair of stepper motors which drive the endless conveyor belts. The signal will cause a power cutoff to the motors for a sufficient period (milliseconds) such that the conveyor belt speed is reduced and the speed of the shrimp traveling to the clamp assembly is stopped thereby altering the time it takes for the shrimp to reach the clamp assembly, the effect being that such alteration serves to properly position a shrimp in the feed system so that it will be fed properly to a rotating clamp assembly.

The multiplier 0.42 is a value determined empirically; however, it has been found that, for various species of shrimp, the value 0.42L represents, in most instances, the distance from a shrimp tail end to the location of the shrimp tail joint. If desired, the multiplier 0.42 can be adjusted approximately ±0.05 which will encompass most species of shrimp which are processed in a shrimp peeling machine.

Once a shrimp is passed from the feed conveyor system to a clamp assembly on the rotating shrimp transport wheel, it then is transported to various work stations such as exemplified and disclosed in U.S. Pat. Nos. 3,751,766, 4,745,660 and 4,439,893 the entire disclosures of which are incorporated by reference herein.

Having the shrimp feed conveyors in line with the clamp assemblies on the shrimp transport wheel such that a shrimp located in the feed conveyors is substantially axially aligned with the longitudinal axis of a shrimp clamp assembly, permits the width of the shrimp peeling machines, such as shown in U.S. Pat. Nos. 4,745,660 and 3,751,766, to be substantially reduced to approximately one-half of the present machine width.

As a shrimp is transported from the feed conveyors to a clamp assembly, it has been found desirable to insure that the shrimp is properly grasped by the tail and body clamps of a clamp assembly. To assure proper orientation of the shrimp in the clamp assembly, a positive driven rotatable wheel or roller is positioned on top of the shrimp and serves to properly seat a shrimp in a clamp assembly.

Once located in a clamp assembly, the shrimp is transported to a cutting station where the shrimp is cut to split open the shell and expose the shrimp vein. It has been found that if the shrimp cutter wheel is rotated in a direction opposite the direction of travel of the shrimp and clamp assembly and the cutter wheel speed is increased, improved cutting of the shrimp occurs in that the cut is a clean or smooth cut unlike a saw-like type cut which sometimes occurs which, unfortunately, results in the edges of the shrimp near the cut line being coarse or rough.

The cut shrimp then is transported past a deveining station where the shrimp vein is removed. Heretofore, a single rotatable deveining brush has been utilized for vein removal. Unfortunately, in some instances, the brush did not entirely remove a vein. Further, shrimp veins would become enmeshed in the brush adversely affecting the ability of the brush to effectively and consistently remove the vein from each shrimp that passed the deveining station. It has been found that a second brush, which has been incorporated to mesh with the first brush, serves to assist the first brush in dislodging the shrimp vein from the shrimp in that it is available to capture a vein which is not fully secured by the first brush. Further, the second brush has its bristles intermeshed with the first brush bristles such that the brushes are able to repeatedly and consistently remove the vein from shrimp as the shrimp travel past the shrimp deveining system.

Subsequent to the shrimp deveining system, the shrimp rotates on the shrimp transport wheel where it travels to a station where the shrimp meat and the tail, in the case of a tail-on shrimp, are removed from the shell. At least one tail clamp assembly and a plurality of tines are mounted on a rotatable shrimp meat removal wheel located contiguous to the shrimp clamp assemblies traveling on the shrimp transport wheel. As the shrimp meat removal wheel rotates, the clamp assembly is cam actuated whereby a pair of clamp arms grasp the shrimp tail while the tines enter the shrimp meat. As the tines and clamp assembly rotate relative to the shrimp transport wheel, the shrimp meat is relatively gently pulled and removed from the rotating shrimp shell which remains clasped in the rotating shrimp clamp assembly fixed to the shrimp transport wheel. The shrimp meat and tail are ultimately removed from the tines and clamp assembly. Similarly, the shell is subsequently removed from the clamp assembly on the shrimp transport wheel.

DESCRIPTION OF THE DRAWINGS

The invention will be better understood from the following detailed description taken in conjunction with the accompanying figures of the drawings, wherein:

FIG. 7 shows a fragmentary section view of one embodiment of a feed conveyor taken along lines 7—7 in FIG. 6;

FIG. 8 shows a top plan view of the feed conveyor taken along lines 8—8 in FIG. 7;

FIG. 9 shows a fragmentary section view of a second embodiment of a feed conveyor;

FIG. 10 shows a top plan view of the feed conveyor taken along lines 10—10 in FIG. 9;

FIG. 23 shows a block diagram illustrating details of the sensing and control system for the second embodiment of the present invention;

FIG. 24 shows a fragmentary, perspective view of a shrimp hold-down wheel assembly disposed above a shrimp clamp assembly for assisting to hold and maintain a shrimp in position as it is grasped by the tail clamp and body clamp of a clamp assembly;

FIG. 25 is a fragmentary end view of the shrimp hold-down wheel assembly of FIG. 24;

FIG. 26 shows a fragmentary, section view taken along lines 26—26 in FIG. 25;

DETAILED DESCRIPTION

Figure 1:
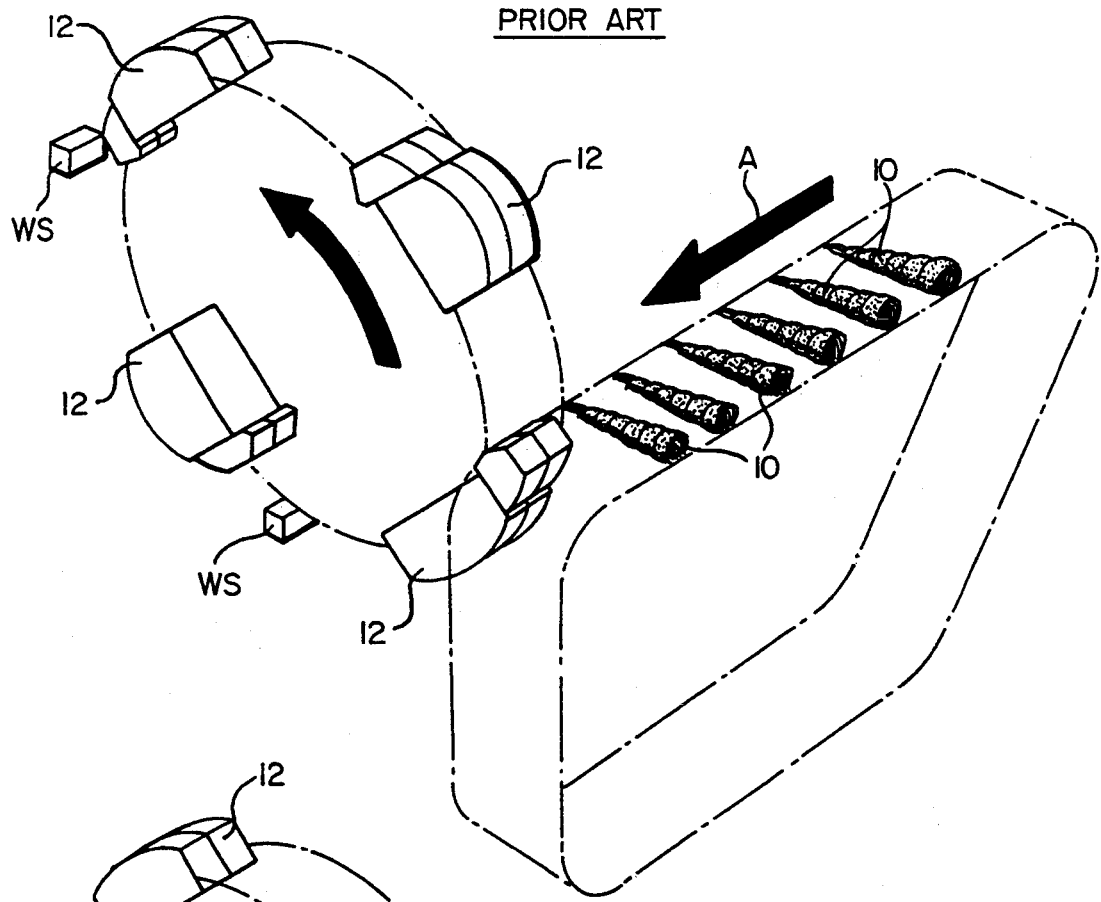
FIG. 1 shows a schematic view illustrating a prior art shrimp feeding system in which shrimp are fed to clamp assemblies positioned on a rotating shrimp transport wheel 90° to the feed conveyor.

Referring to the drawings, FIG. 1 shows a schematic view of a conventional prior art shrimp peeling machine in which shrimp 10 to be peeled are placed in individual shrimp trays. The trays are connected to and travel on a moving endless conveyor belt which transport shrimp 10 to be peeled in the direction of arrow "A." Shrimp 10 subsequently are removed from the trays and transferred to shrimp clamp assemblies 12 which are connected to and rotate with a shrimp transport wheel in the direction of arrow "B" past one or more work stations WS where a shrimp is cut, deveined and the body shell and tail sections can be removed. In this system, the details of which are set forth in detail in U.S. Pat. Nos. 4,439,893 issued Apr. 3, 1984, and 3,751,766 issued Aug. 14, 1973, the disclosures and drawings of which are incorporated herein by reference, the shrimp feed system is positioned to travel at 90° to the direction of travel of the shrimp clamp assemblies 12.

Figure 2:
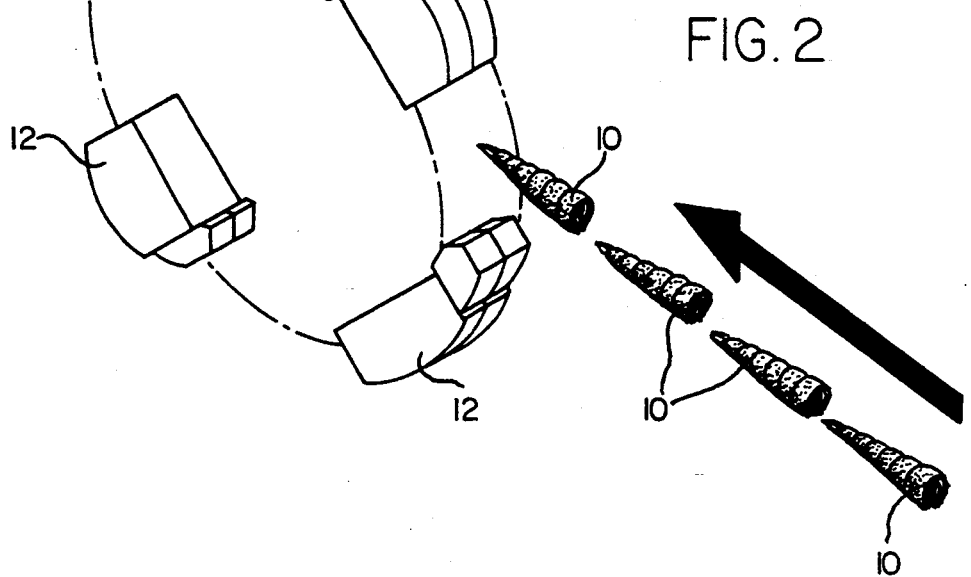
FIG. 2 shows a schematic view illustrating the shrimp feed system of the present invention in which shrimp are fed along a longitudinal axis which is substantially in alignment with the longitudinal axes of the clamp assemblies located on a rotating shrimp transport wheel.

FIG. 2 illustrates the shrimp feed system of the present invention. As will be discussed in detail hereafter, shrimp 10 are fed in line with the direction of travel of the clamp assemblies 12 with the feed system being substantially longitudinally aligned with the longitudinal axis of the clamp assemblies 12. As a result, the width of the conventional shrimp peeling machine illustrated in FIG. 1 can be substantially reduced.

Figure 3:
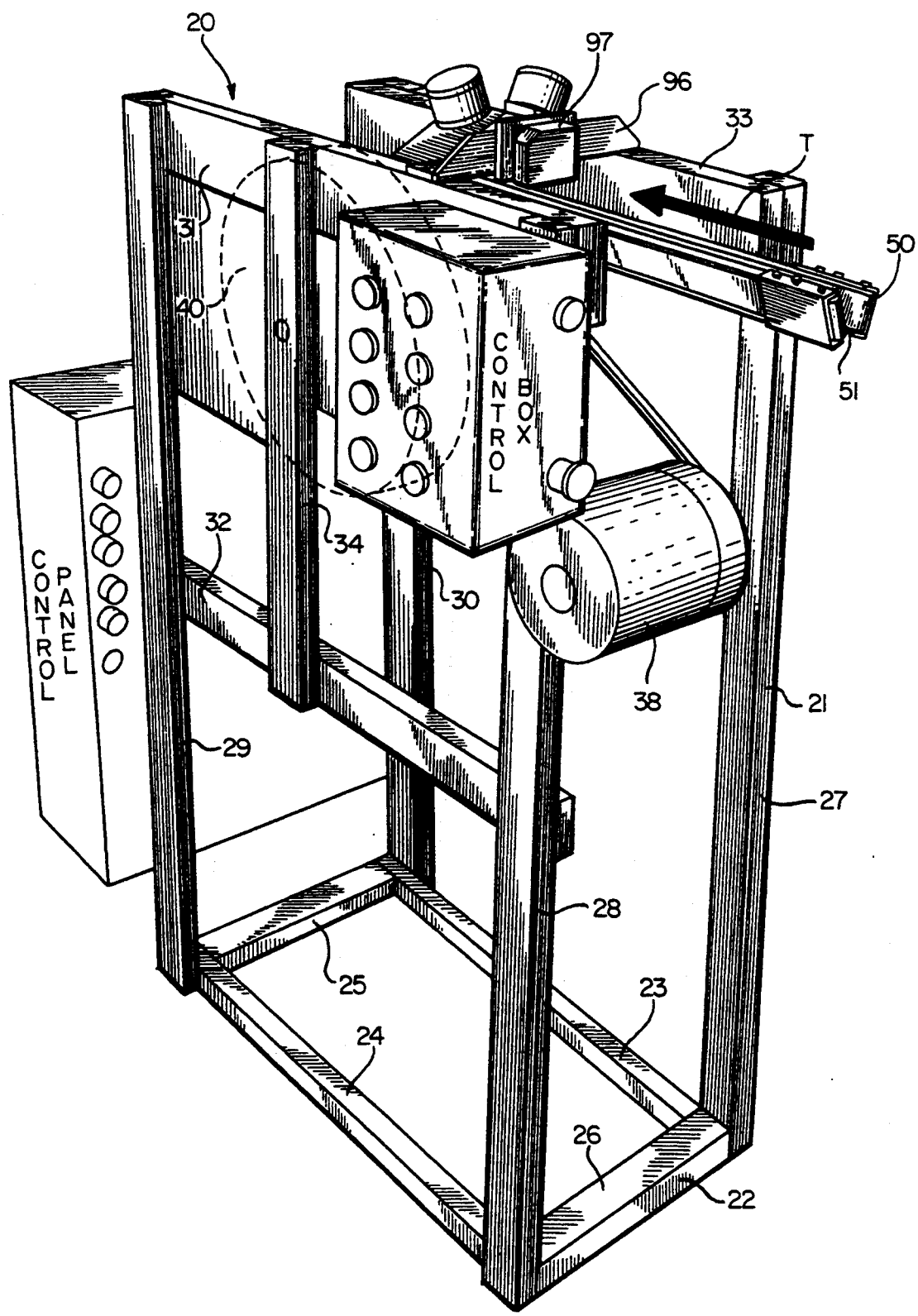
FIG. 3 shows a fragmentary perspective view of the shrimp feed device of the present invention disposed within the frame support of a shrimp peeling machine.
Figure 4:
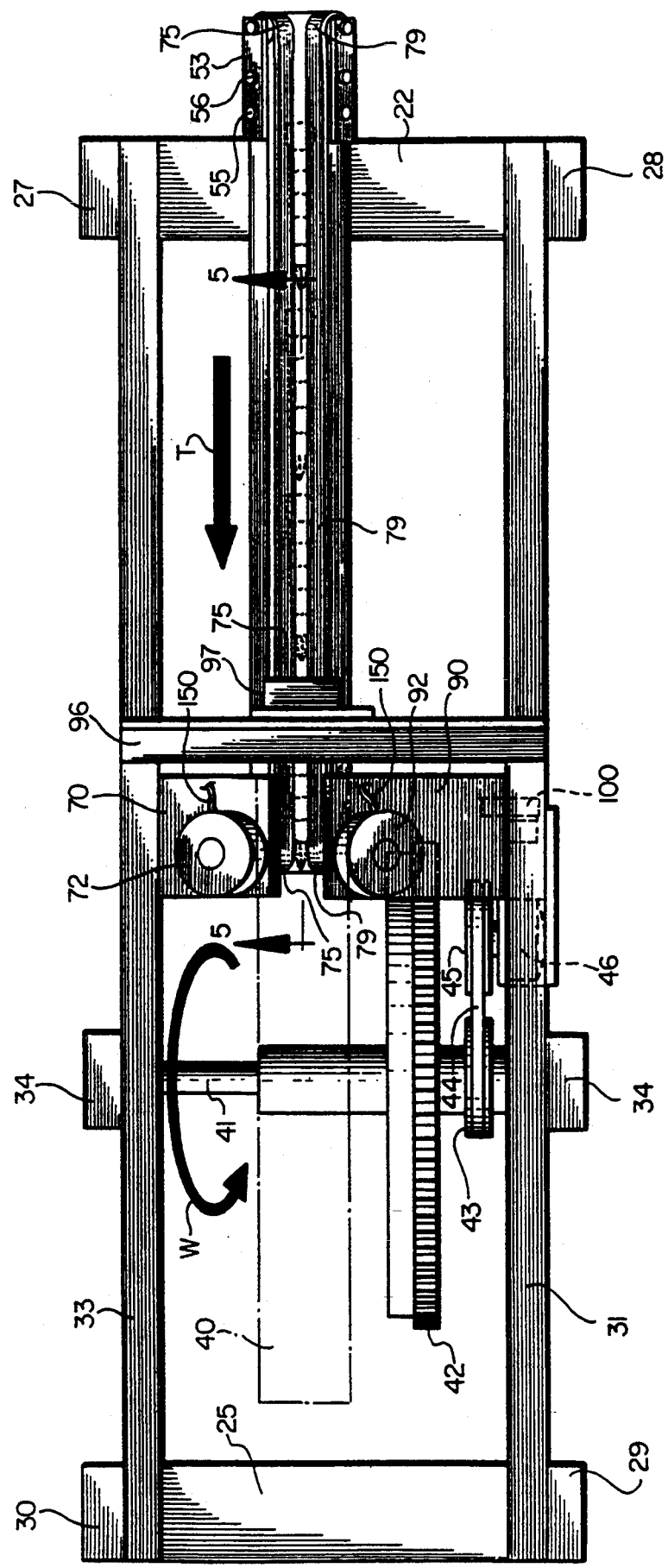
FIG. 4 shows a top plan view of the shrimp feed device of the present invention.

FIG. 3 shows the shrimp feed system of the present invention. Specifically, the shrimp peeling machine 20 comprises frame 21 made of suitable metal and/or plastic which includes base 22 consisting of frame members 23, 24 connected at their respective ends to frame members 25, 26. Extending upward from base 22 are vertical support members 27, 28, 29, 30. Spaced horizontal support members 31, 32, 33, see FIG. 4, are connected to the vertical support members. Additional support members such as vertical support 34 can be utilized as desired to provide the desired rigidity to frame 21.

Figure 5:
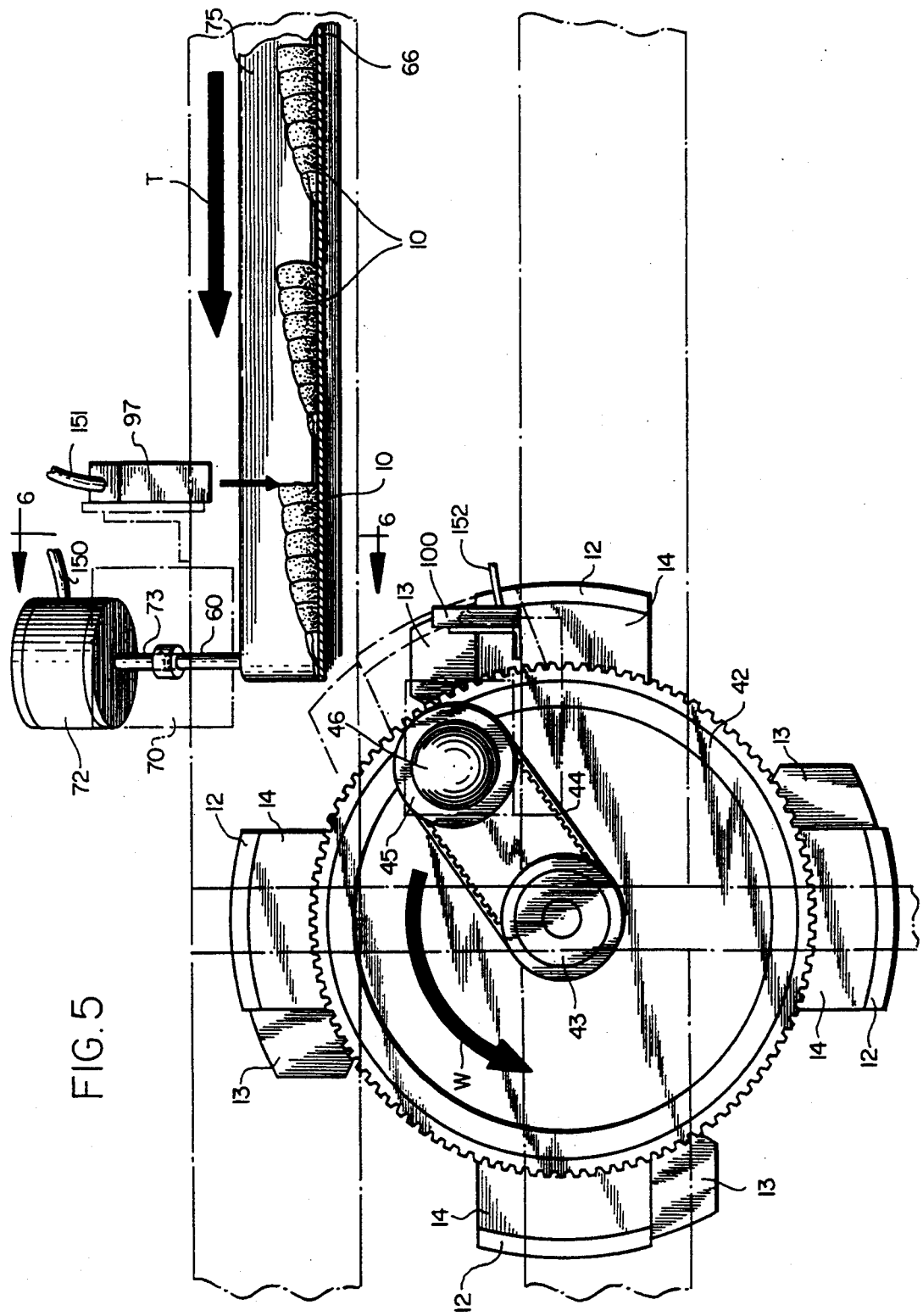
FIG. 5 shows a fragmentary side section view of the shrimp feed device taken along lines 5—5 in FIG. 4.

Mounted within frame 21 is a shrimp transport wheel 40 which is schematically illustrated in FIG. 3 and shown in more detail in FIGS. 4 and 5. As seen in FIG. 5, a plurality of clamp assemblies 12 are connected to shrimp transport wheel 40. Each clamp assembly includes shrimp tail clamp 13 and shrimp body clamp 14. The details of the shrimp transport wheel, clamp assemblies and their operation are shown and explained in detail in U.S. Pat. Nos. 4,769,871 issued Sep. 13, 1988 and 3,751,766, the disclosures and drawings of which are incorporated herein by reference.

Shrimp transport wheel 40 having clamp assemblies 12 mounted thereon is mounted for rotation at a constant speed on rotatable shaft 41. Drive shaft 41 is connected to a suitable drive assembly and motor 38 such as disclosed in the '871 patent. Pulley 43 is mounted on shaft 41 and is connected by belt 44 to pulley 45 which is connected to an encoder device 46.

As seen in FIG. 3, a pair of spaced shrimp feed conveyor assemblies 50, 51 are located at one end of the top of frame 21. Conveyor assembly 50 comprises bar 52 (see FIG. 8) having a plurality of threaded holes 52' located at one end. Slotted brackets 53, 54 are adjustably mounted on bar 52 by means of mounting bolts 55, 56 which bolt brackets 53, 54 at the desired location relative to one end of bar 52. A rotatable shaft 57 having a bushing 57' is mounted in suitable bearings at end 58 of the brackets.

At the opposite end 59 of bar 52 is located another shaft member 60 having shaft head 61. Bushing 62 is mounted on shaft 60 with mounting washers 63, 64 disposed at each end of the bushing. Plate 66, as seen in FIG. 6, is disposed between shaft head 61 and washer 63.

Figure 6:
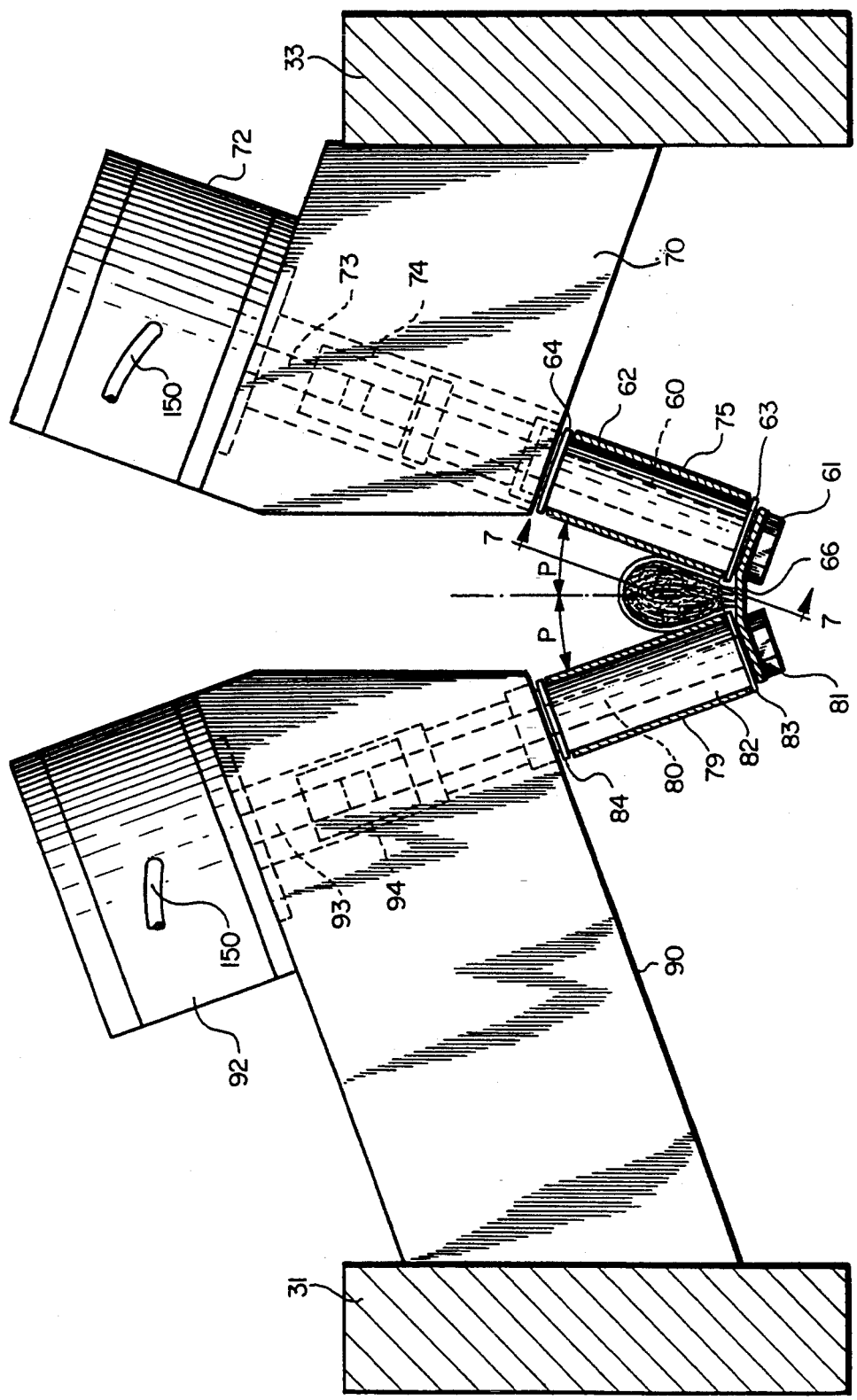
FIG. 6 shows a fragmentary end section view of the shrimp feed device taken along lines 6—6 in FIG. 5.

Shaft 60 extends upward past washer 64 into mounting bracket 70, FIGS. 4, 6, which extends outward from horizontal support member 33. Disposed on top of mounting bracket is stepper motor 72 having motor shaft 73 which extends into bracket 70. A suitable flexible coupling 74 connects stepper motor shaft 73 to the outboard end of conveyor belt shaft 60. Shaft 60 also is disposed in one or more bushings mounted in mounting bracket 70.

An endless conveyor timing belt 75 is mounted for rotation on rotatable bushing 62 fixed to rotatable shaft 60 and bushing 57' on shaft 57, belt 75 contacting the sides of bar 52 as it rotates. As seen more clearly in FIGS. 3 and 6, conveyor belt 75 is purposely disposed at a suitable angle offset to the vertical axis so as to ensure that it will contact a shrimp as it enters the feed system, the conveyor belts 75, 79 also serving to transport a shrimp along the length of the conveyor belts.

A second conveyor timing belt 79 is mounted in the same type bar arrangement as described above for conveyor belt 75. Shaft 80 having shaft head 81 extends upward through mounting bracket 90. Bushing 82 disposed between washers 83, 84 is attached for rotation with shaft 80.

Stepper motor 92 has a motor shaft 93 which extends into bracket 90. A suitable flexible coupling 94 connects stepper motor shaft 93 to the outboard end of conveyor belt shaft 80.

Actuation of stepper motors 72, 92 causes movement of endless belts 75, 79. Shrimp 10 fed to the endless conveyors will be contacted by endless belts 75, 79 and transported along the length of the conveyor belts in the direction of arrow "T," FIG. 5, toward the clamp assemblies 12 which are connected to the rotating shrimp transport wheel 40 and rotating in the direction of arrow "W," FIG. 5.

As in the case of conveyor belt 75, conveyor belt 79 also is mounted at an angle offset from the vertical, FIG. 6, to ensure that a shrimp disposed in the feed system contacts the conveyor belts 75, 79. It has been found that an angle of inclination "P" of approximately 15°–30° is satisfactory.

Further, plate 61 seen in FIG. 6 extends along the length of the shrimp feed conveyor device. In some applications, it may be desirable to omit plate 66 in favor of an open space between the lower portions of the spaced and angled conveyor belts 75, 79.

Referring to FIGS. 3, 4 and 5, plate 96 extends across the frame and is connected to frame members 31, 33. A laser device sensor 97 is connected to plate 96 and overlies the location of the narrowest space between conveyor belts 75, 79. As shrimp 10 pass through the feed conveyor device in the direction of arrow "T," FIG. 5, laser sensor 97 will sense or ascertain the tail end of a shrimp 10 and subsequently sense the head end of shrimp 10. The information sensed by the laser sensor 97 will be passed through lead 151 to a microprocessor 155 where the overall length "L" of a shrimp 10 is computed. The microprocessor then computes a value of 0.42L which represents the location of the interface of the tail section of the shrimp and remainder of the shrimp.

Simultaneously, as the shrimp are being fed in the direction of arrow "T" along the length one the conveyor belts, the shrimp transport wheel 40 and clamp assemblies 12 are rotating about shaft 41 in the direction of arrow "W." As illustrated in FIGS. 3 and 4, the longitudinal axis of the feed conveyor belts along the length of the path "T" is substantially aligned with the longitudinal axis of a clamp assembly 12.

A photoelectric cell 100 is attached by any suitable means to the frame 21. Cell 100 provides a constant beam across the frame. As each clamp assembly 12 rotates about shaft 41, it will interrupt the beam which interruption is passed through lead 152 to the microprocessor 155 where the relative location between a clamp assembly 12 and a shrimp 10 is ascertained. Specifically, what is desired is to have the tail section of a shrimp seat properly in the tail clamp 13 of clamp assembly 12 whereas the remaining portion of a shrimp must be clamped properly in body clamp 14 of clamp assembly 12. Accordingly, it is necessary that the arrival of a shrimp 10 at the ends of the conveyor feed belts 75, 79 located adjacent the shrimp transport wheel 40 be synchronized with the arrival of a clamp assembly 12 at the shrimp drop off end of the conveyors 75, 79.

The microprocessor 155 and encoder device 46 translate the information received from the laser beam 97 and the photoelectric cell 100 from which it is computed whether proper synchronization will occur, i.e., whether a shrimp 10 will be transferred from the conveyors 75, 79 onto a clamp assembly such that the tail clamp 13 clamps the tail section of the shrimp 10 and the body clamp 14 clamps the remainder of the shrimp so that the location 0.42L on the shrimp 10 is at the interface of the tail clamp 13 and body clamp 14. It is important to have the shrimp properly oriented with respect to the tail and body clamps 13, 14 in order that the tail section of the shrimp be properly removed.

It is appreciated that in loading shrimp 10 into the spaced feed conveyors 75, 79, the shrimp will not always be positioned to achieve the desired synchronization between a shrimp 10 and a clamp assembly 12. In the instances where the microprocessor 155 and the encoder device 46 sense and compute the information received from laser device 97 and photoelectric cell 100 and ascertain that a shrimp 10 will arrive too early at the shrimp drop off end of conveyors 75, 79, the microprocessor 155 will issue a command through leads 150 to stop stepper motors 72, 92 for a requisite amount, milliseconds, in order that the shrimp 10 and a clamp assembly 12 arrive at the drop off end simultaneously.

In the event that a shrimp 10 will not arrive at the shrimp drop off end of conveyor belts 75, 79 in time to be clamped by a clamp assembly 12, the clamp assembly 12 simply continues to rotate past the shrimp drop off assembly without receiving a shrimp and the shrimp 10 then will be deposited on a succeeding clamp assembly 12.

Figure 11:
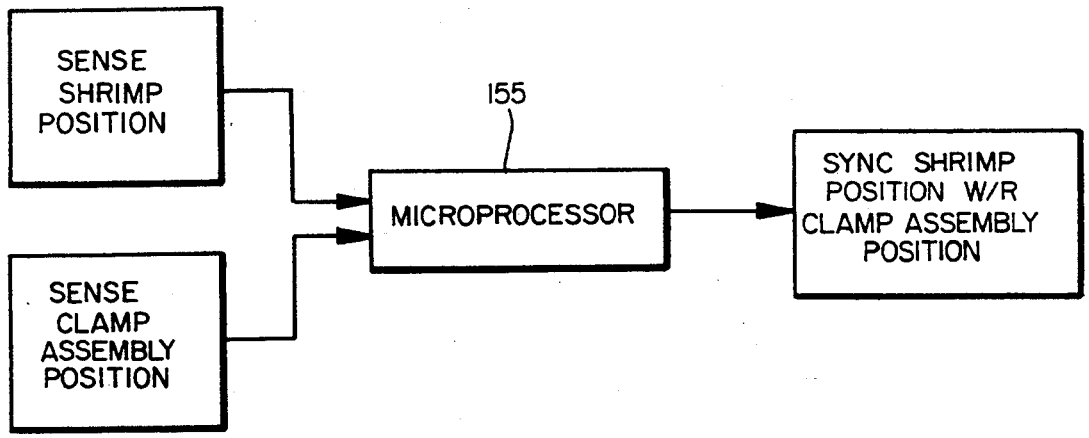
FIG. 11 shows a block diagram illustrating the sensing and control system for synchronizing the location of a clamp assembly and a shrimp being fed to a clamp assembly.
Figure 12:
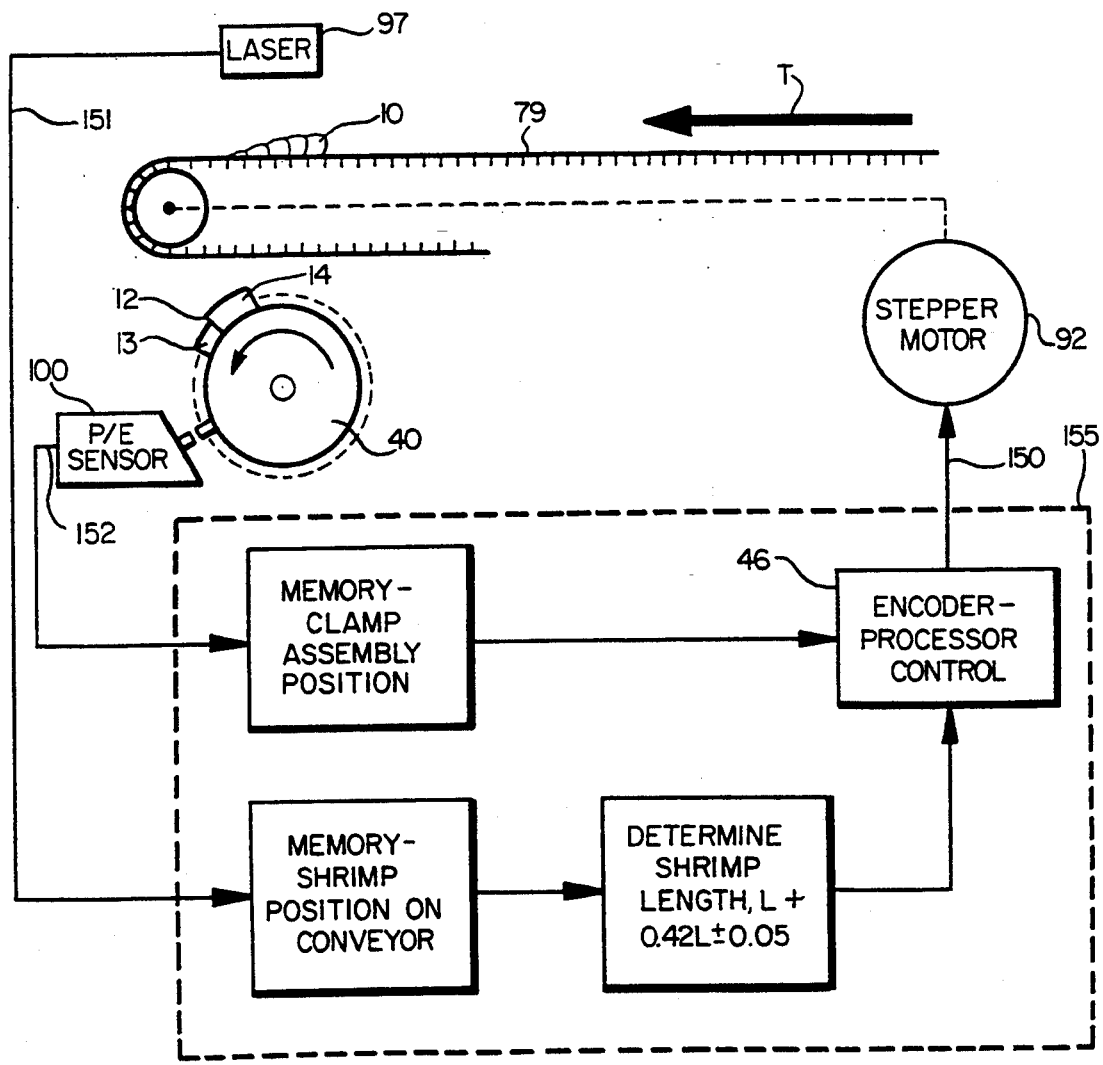
FIG. 12 shows a block diagram illustrating details of the sensing and control system utilized in the present invention.

FIGS. 11 and 12 may be referred to as illustrations of the microprocessor components and functions to carry out the present invention. The following program listings illustrate a program for controlling microprocessor 155 in the above-described operations.

```
4 GOSUB 400
5 RATIO=22.894998
10 ENCODER=1000
15 RUN.SPEED=659
20 ACCEL.RATE—150000
25 DECEL.RATE=150000
28 GO.VEL
30 SK1.TRIGGER=21
40 SK2.TRIGGER=20
100 SK1.GOSUB=300
110 SK2.GOSUB=350
115 SET.SCAN1
125 INT1=820+INT2
130 WHILE INP1=1
140 INT5=POS.COMMAND
150 WEND
160 WHILE INP1=0
170 INT6=(POS.COMMAND−INT5)
172 FLT1=INT6 * (0.420000)
180 WEND
190 RUN.SPEED=0
195 GO.VEL
200 INT3=FLT1/RATIO
210 INT2=0
220 WHILE INT3<=(INT1−ENCDR.POS)
240 WEND
250 RUN.SPEED=659
255 GO.VEL
260 GOTO 130
299 END
300 ENCDR.POS=0
310 SET.SCAN2
320 RETURN
350 SET.SCAN1
360 RETURN
400 INT10=(INP5+(2 * INP6)+(4 * INP7)+(8 * INP8) )
405 IF INT10=15 THEN INT2=(−60)
410 IF INT10=14 THEN INT2=(−45)
415 IF INT10=13 THEN INT2=(−30)
420 IF INT10=12 THEN INT2=(−20)
425 IF INT10=11 THEN INT2=(−10)
430 IF INT10=10 THEN INT2=0
435 IF INT10=9 THEN INT2=12
440 IF INT10=8 THEN INT2=24
445 IF INT10=7 THEN INT2=36
450 IF INT10=6 THEN INT2=48
455 RETURN
```

While a laser beam sensor 97 and photoelectric cell 100 have been disclosed, it is appreciated that other types of sensing means such as light emitting diode sensors, would be satisfactory to provide the desired input from which the proper synchronization between a shrimp 10 arriving at the shrimp drop off end of the conveyors 75, 79 along with a clamp assembly 12 could be determined.

In the embodiment of FIGS. 1–6, the laser sensing means is positioned above feed conveyors 75, 79 such that the laser beam projects vertically down on the shrimp 10.

If desired, another conveyor system can be employed which will permit the laser beam to be projected horizontally. In the shrimp feed conveyor embodiment of FIGS. 9 and 10, two spaced feed conveyors 110, 112 replace the single feed conveyor 75 and two spaced feed conveyors, similar to spaced conveyors 110 and 112, would replace conveyor 79. FIG. 9 shows a first feed conveyor 110 which is similar in arrangement to the feed conveyor embodiment 75 in that a rotatable shaft 111 would be connected by a flexible coupling to a stepper motor. A bushing 113 would be rotatable with shaft 111 located adjacent one end of bar 114. At the opposite end of bar 114 a mounting block 115 is affixed to bar 114. One end of mounting bracket 116 is fixed to mounting block 115 while the remaining end of mounting bracket 116 is fixed to mounting block 117 which, in turn, is fixed to one end of bar 118. Mounting brackets 119, 120 are fixed adjustably in any suitable manner, to and extend outward from the remaining end of bar 118. A rotatable shaft and bushing 121, 122 are connected to brackets 119, 120.

Another mounting bracket 123 is connected to the bottom side of bars 114, 118. Shafts 124, 125 have bushings 126, 127 disposed thereon. Pulley belt 130 connects pulleys 128, 129 which are mounted on shafts 124, 125. Upon actuation of the stepper motor, shaft 111 will rotate causing movement of belt 110. Similarly, shaft 125 will rotate along with shaft 124 causing movement of endless conveyor belt 112.

It will be noted in FIG. 9, that a space is provided between conveyor belts 110, 112. In this space a laser beam, indicated by 140 is positioned so that as a shrimp 10 travels in the direction "T'," the laser beam 140 will extend horizontally and sense the tail end and head end of the shrimp.

Figure 13:
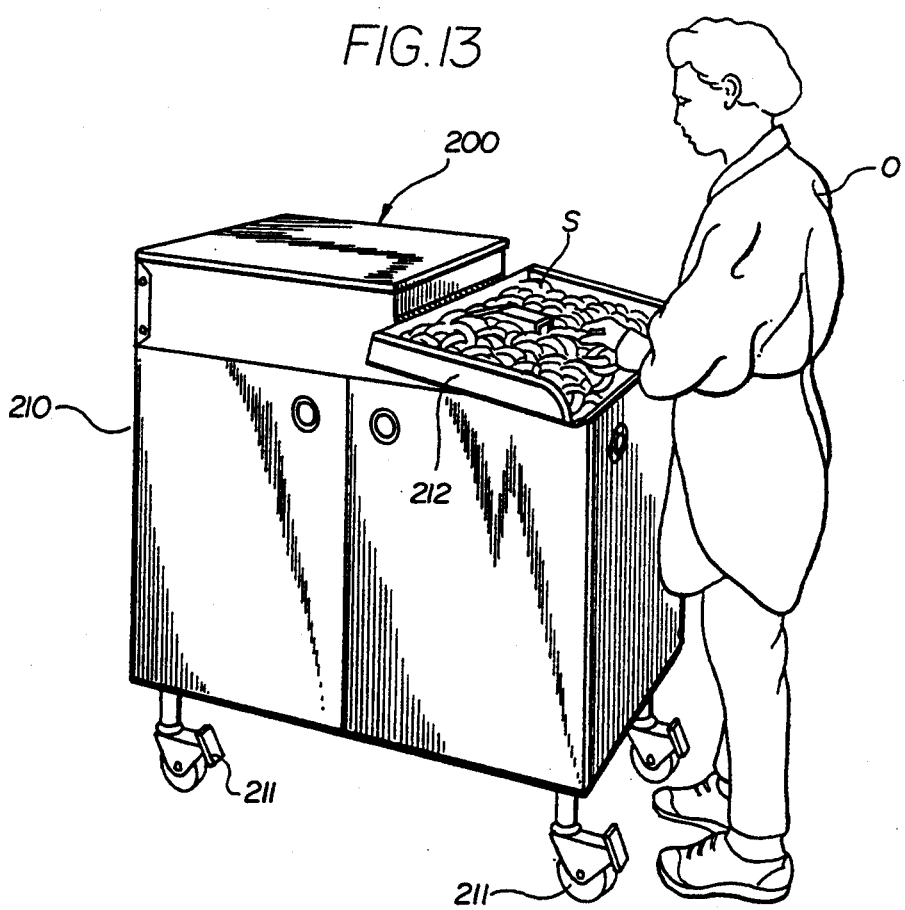
FIG. 13 shows a perspective view of a second embodiment of the invention in which an operator feeds a shrimp to the shrimp feed system.
Figure 14:
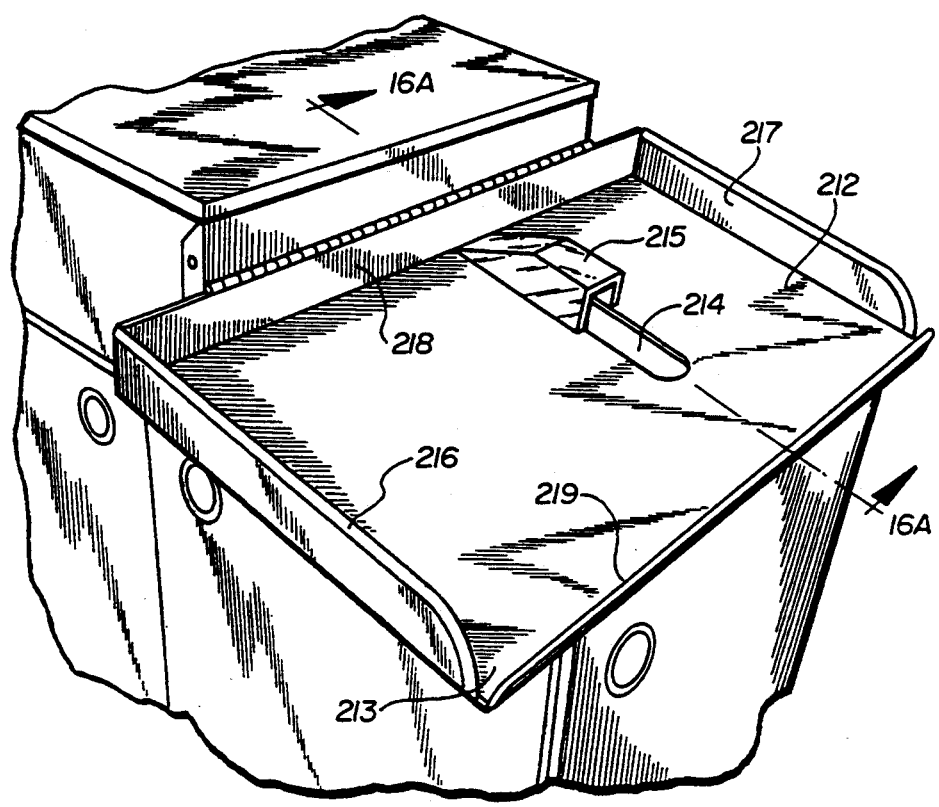
FIG. 14 shows an enlarged, fragmentary, perspective view of the shrimp tray of FIG. 13 absent shrimp disposed on the tray.

FIGS. 13–34 inclusive show further embodiments of the invention. Referring to FIGS. 13 and 14, a shrimp peeling machine 200 is enclosed within a housing 210. The machine is seated on a plurality of conventional start-stop wheels 211 so that the machine can be transported relatively easily from one position to another. A plurality of shrimp S are placed on shrimp feed tray 212. Tray 212 comprises a base 213 having a slotted opening 214 therein. A transparent plastic cover 215 is suitably fixed to tray base 213. Tray side walls 216,217 and end walls 218,219 extend upwardly from base 213 and serve to contain shrimp to be peeled on tray base 213.

Figure 15:
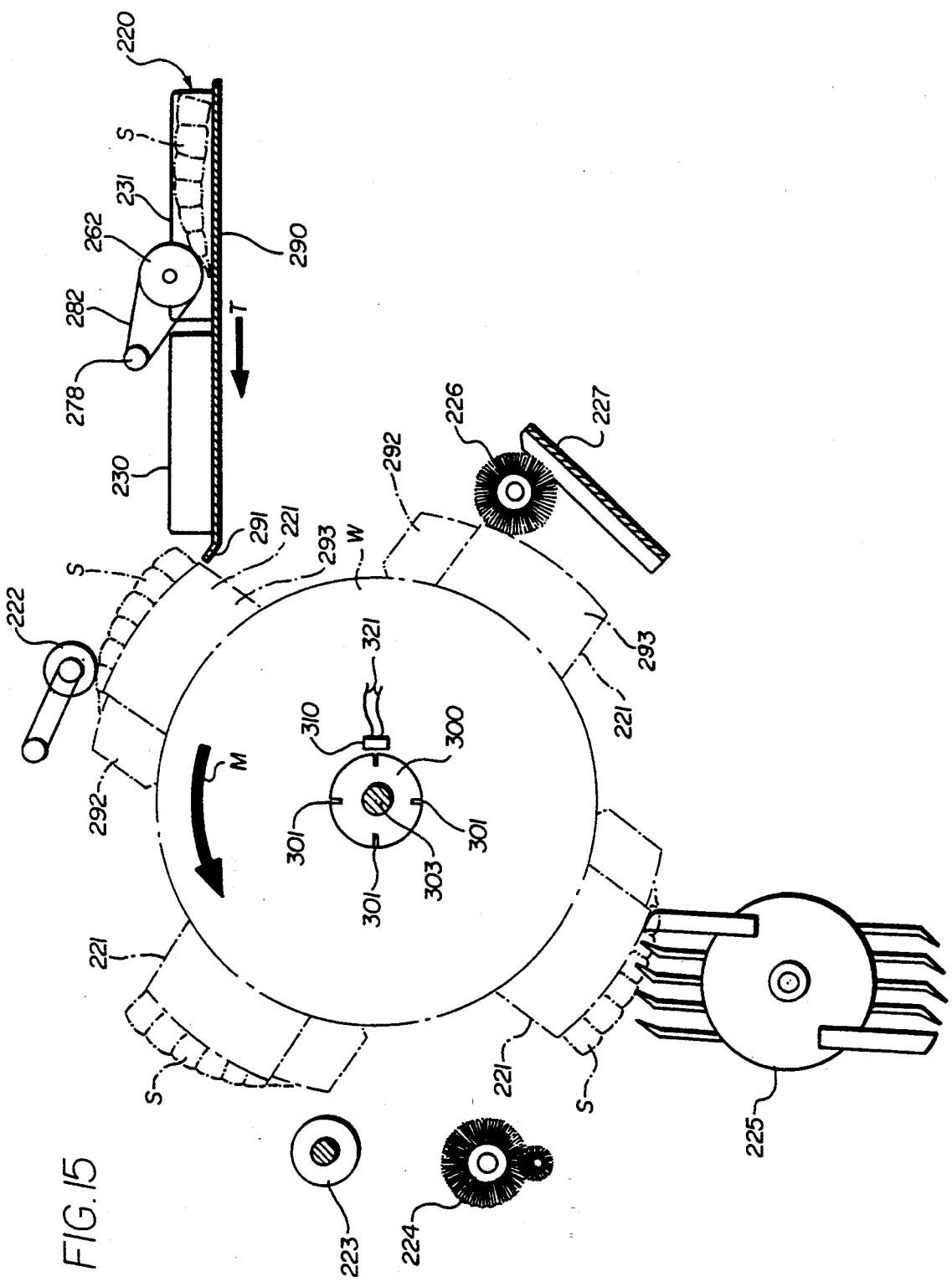
FIG. 15 shows a schematic of the shrimp feed system of the second embodiment of the invention as well as the clamping of a shrimp in a clamp assembly and the transporting of the shrimp past cutting, deveining, meat picking and shell removal stations.

Referring to FIG. 15, shrimp S is disposed on feed conveyor 220 where it passes under a shrimp hold-down device 262. The shrimp, as will be discussed hereafter, is transferred to a clamp assembly 221 located on a rotatable shrimp transport wheel W, the shrimp being urged toward the wheel during clamping by hold-down wheel or roller 222. Once the tail and body portions of the shrimp are securely fastened to clamp assembly 221, the shrimp is transported past a plurality of work stations where various operations are performed on the shrimp. Initially, the shrimp passes a cutting station 223 where the shrimp shell and meat are cut along the longitudinal axis of the shrimp. The cutting operation serves to cut open the shrimp shell for a substantial portion of the shrimp length and the shrimp meat is cut to expose the shrimp vein.

Following cutting, the shrimp is transported past a dual brush deveining station 224 where at least one brush contacts the shrimp and vein to remove the vein from the shrimp. The second brush, whose bristles intermesh with the first brush bristles, also serves to contact and disengage the vein from the shrimp. Further, the intermeshing of the brush bristles serve to assist in keeping a shrimp vein from becoming too severely entangled in the first brush bristles.

Following the deveining operation, shrimp S moves past a rotatable shrimp meat removal device 225 where a plurality of tines and a tail clamp assembly engage the shrimp meat and shrimp tail and, as the shrimp meat remover device and clamp assembly both rotate, the shrimp meat and tail, in the case of a tail-on shrimp, are withdrawn from the shrimp shell, which is located in a clamp assembly on the rotating shrimp transport wheel. The meat and tail are directed to a collection site while the shell is subsequently removed from clamp assembly 221 following which assembly 221 is cleaned by brush 226 while the shell is directed down slide 227 to a second collection site.

Figure 16A:
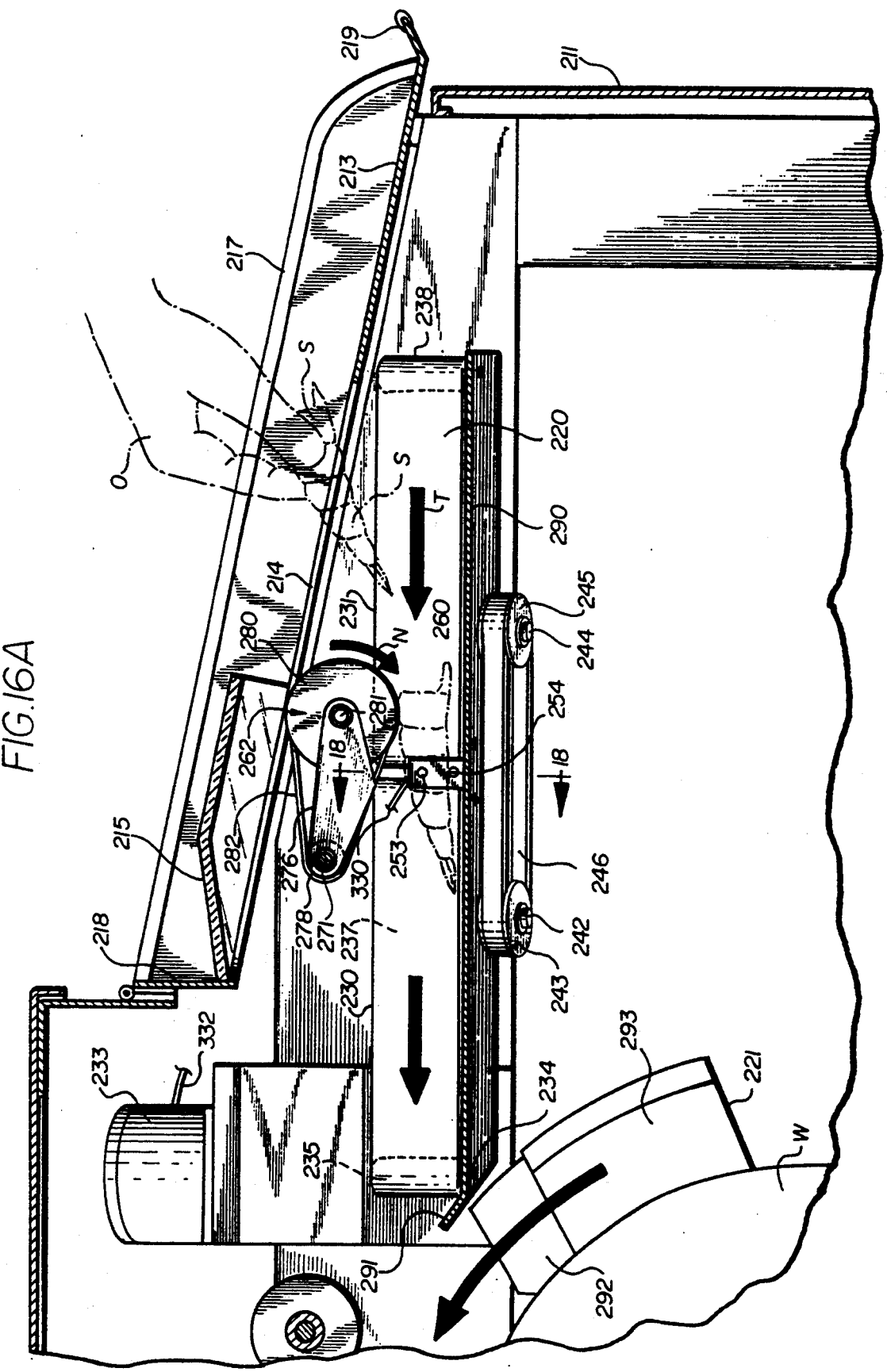
FIG. 16A shows a fragmentary section view taken along lines 16—16 in FIG. 14 in which an operator is placing a shrimp to be processed on the shrimp feed conveyor.
Figure 16B:
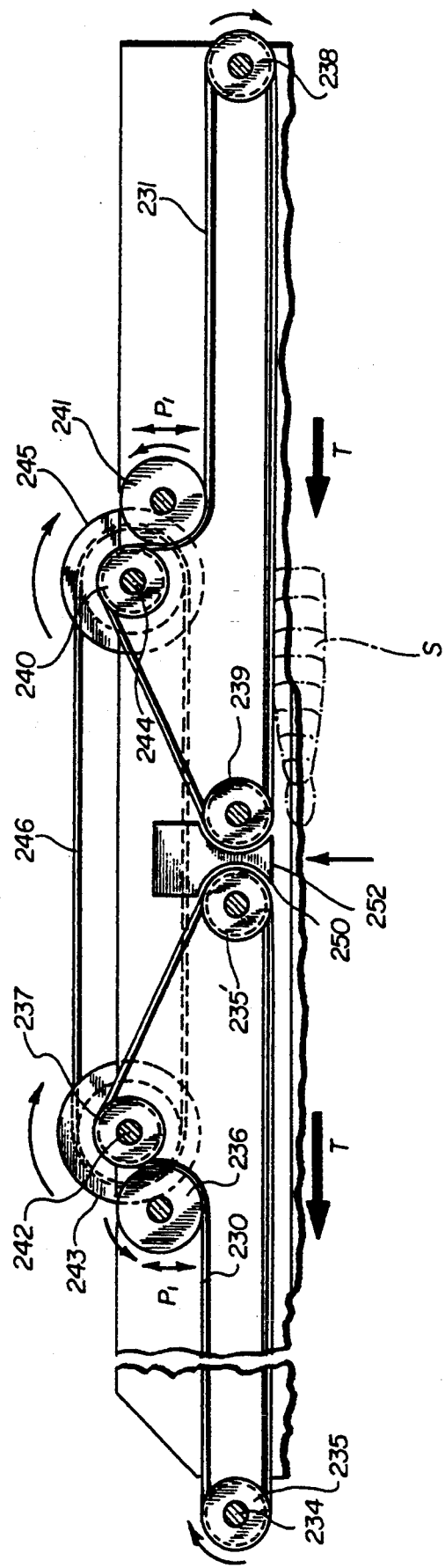
FIG. 16B shows a schematic plan view of two feed conveyors located on one side of the shrimp feed conveyor system taken along lines 16B—16B in FIG. 17.
Figure 17:
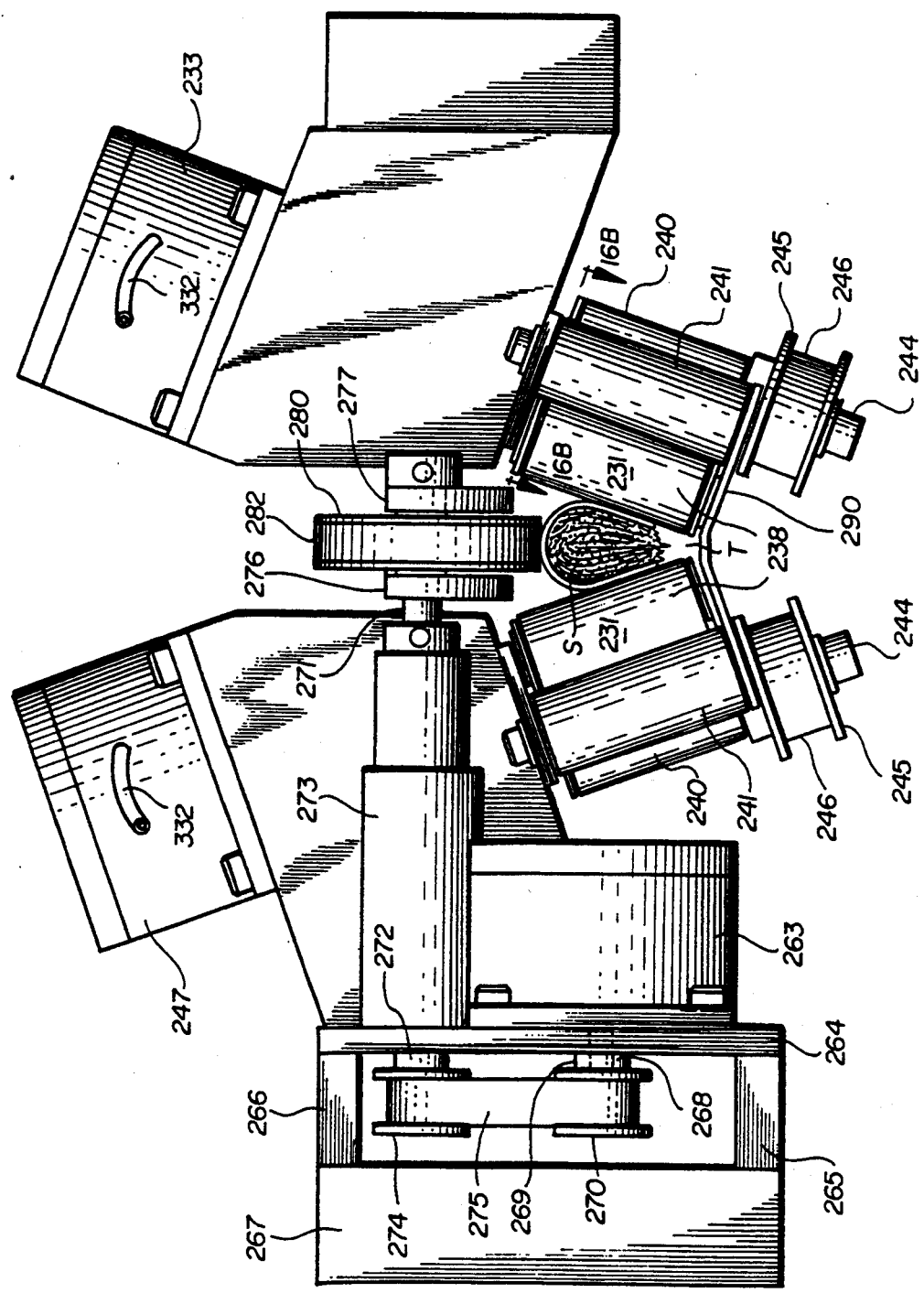
FIG. 17 shows an end view of FIG. 16A absent the tray and housing.
Figure 18:
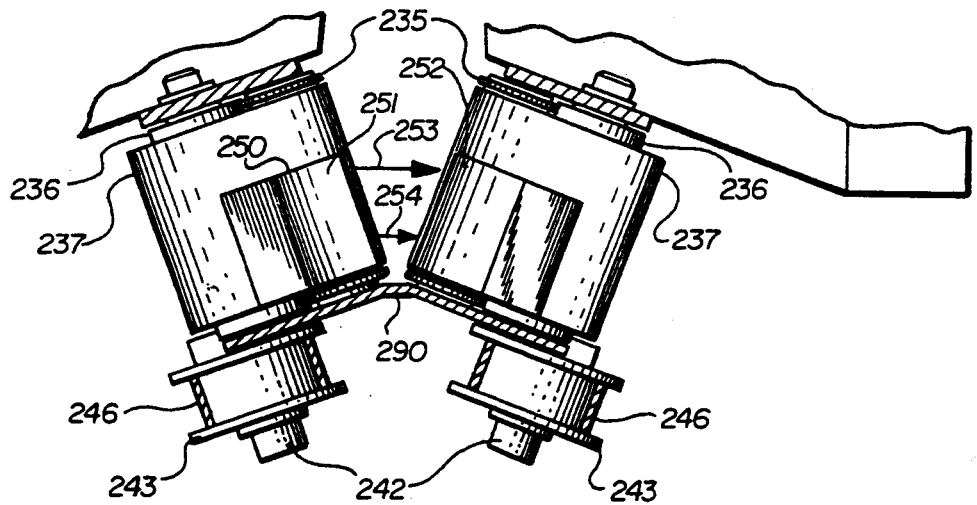
FIG. 18 Shows a fragmentary, section view taken along lines 18—18 in FIG. 16A of the sensing means of the second embodiment of the invention.

Turning to FIGS. 16A, 16B and 17, shrimp S is shown being passed through slot 214 by an operator O. The conveyor feed system comprises a pair of in-line feed conveyors 230, 231 located on one side of the shrimp transport path and a second pair of corresponding in-line conveyors 230, 231 located on the opposite or remaining side of the shrimp transport path.

The in-line conveyor system used for this particular embodiment of the shrimp feed system is similar to the conveyor embodiment previously described with respect to the embodiment shown in FIGS. 9 and 10; however, in this particular embodiment, idler wheels for tensioning the endless conveyor belts have been provided.

FIGS. 16A and 16B illustrate a pair of conveyors 230, 231 disposed on one side of shrimp S as the shrimp travels along the conveyor feed path T. A stepper motor 233 is connected to rotatable shaft 234 in a manner previously described with respect to the feed conveyor system of FIGS. 7–10. A bushing 235 is fixed to drive shaft 234. At the opposite end of conveyor belt 230 is another rotatable bushing 235'. Unlike the conveyor system of FIGS. 9 and 10, a pair of idler wheels 236, 237 are mounted in any suitable fashion to a mounting bar 114 similar to the bar shown in FIG. 10. Conveyor belt 230 winds about bushing 235, idler wheels 236, 237 and bushing 235'.

A second conveyor belt 231 is arranged in much the same manner as the first conveyor belt 230 save, as will be explained, there is no direct connection to stepper motor 233. Belt 231 winds about rotatable bushings 238, 239 and idler wheels 240, 241.

To drive the conveyor belt 231, a rotatable shaft 242, FIGS. 16A, 16B, upon which idler wheel 237 is disposed, is extended and belt pulley 243 is mounted thereon. Similarly, rotatable shaft 244, upon which idler wheel 240 is mounted, is extended and belt pulley 245 is mounted thereon. Endless belt 246 connects belt pulleys 243, 245 such that upon actuation of stepper motor 233, endless conveyor belts 230, 231 are actuated to contact and move shrimp S along path T. It is appreciated that a similar conveyor system having a pair of axially aligned conveyor belts, similarly numbered, as previously described with respect to belts 230, 231 is located on the opposite side of the shrimp path and is driven by stepper motor 247.

In the event conveyor belts 230, 231 become loose, idler wheels 236, 241 may be adjustably moved, in the direction indicated by the arrows $P_1$, $P_2$ in FIG. 16B, toward or outward away from the belts to a desired position to provide the desired belt tension.

Figure 19:
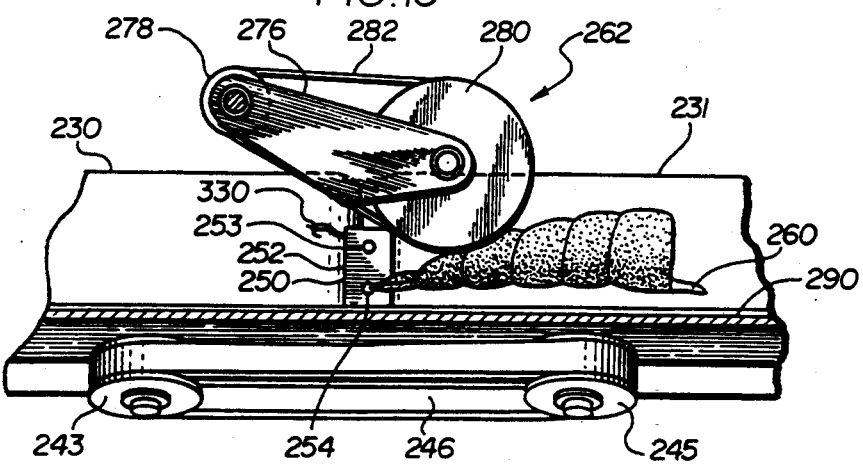
FIG. 19 shows a fragmentary side view of the shrimp feed conveyor system with a shrimp tail positioned at a sensing means.
Figure 20:
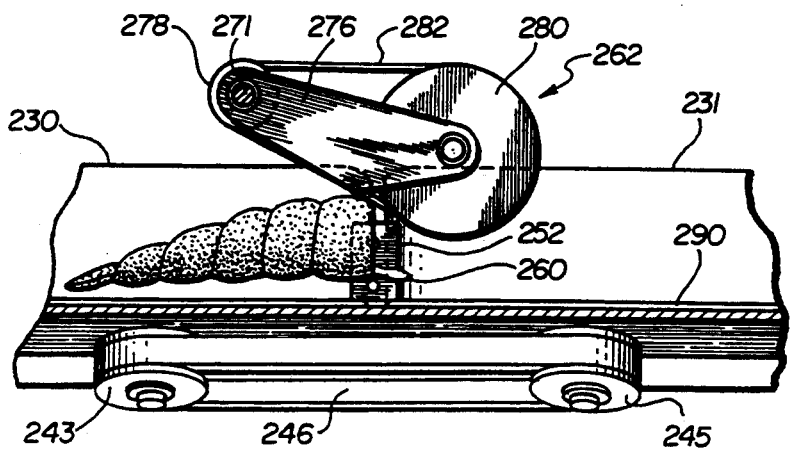
FIG. 20 shows the fragmentary side view of FIG. 19 with the shrimp head positioned at the sensing means.

Referring to FIGS. 16A–20, a space is provided between a conveyor belt 230 and a conveyor belt 231. A photoelectric sensing device 250, comprising emitter 251 and receiver 252, provides high and low sensing beams 253, 254 which traverse the shrimp path. As a shrimp tail passes sensing device 250, as shown in FIG. 19, the low beam 254 is interrupted to provide a signal to microprocessor 155. Similarly, as the high end of the shrimp passes sensing device 250, as shown in FIG. 20, the high sensing beam 253 is actuated to provide a suitable signal to the microprocessor whereby the length L of a shrimp can be computed. It should be observed that, in some instances, when the shrimp head or carapace is removed, a small shrimp throat section 260 remains (FIGS. 19, 20). It is particularly preferred that this shrimp section not be utilized in ascertaining the shrimp length L. As a result, provision is made no mount the high and low sensing beams 253,254 so that the shrimp throat section will not interrupt or otherwise actuate a beam whereby an improper signal is passed to the microprocessor.

It has been found that as shrimp is delivered by the operator to the feed conveyor system, some shrimp may be curved more so than others, such that, in some instances, due to the shrimp curvature, the true shrimp length is not always ascertained. To obviate any concern that the correct shrimp length is not being presented to sensing device 250, a shrimp hold-down device is provided which presses downward on the shrimp as it passes the region of the sensing device 250. By pressing down on the shrimp, which is somewhat of a compressible structure, the proper shrimp length can be measured.

The hold-down device 262 is shown, for example, in FIGS. 16A and 17, Stepper motor 263 is suitably attached to plate 264, which, in turn, is spaced by spacers 265, 266 from frame member 267. Stepper motor drive shaft 268 extends through plate 264 and bushing 269. Pulley 270 is mounted to stepper motor drive shaft 268. Shaft 271 extends through bushings 272 and sleeve 273. One end of shaft 271 is fastened to belt pulley 274 which connects to pulley 270 by endless belt 275.

Mounted on the outboard end of shaft 271 are spaced mounting brackets 276, 277. Each bracket is positioned against one side of sprocket 278. The mounting brackets each have one end suitably fixed to shaft 271, the brackets being adapted to pivot about shaft 271. The remaining or opposite end of each mounting bracket is attached to one end of a shaft 281. Sprocket 280 is mounted for rotation on shaft 281. An endless conveyor belt 282 is mounted on sprockets 278, 280. Upon actuation of stepper motor 263, belt 275 drives shaft 271 and sprocket 278. Endless belt 282 causes sprocket 280 to rotate in the direction shown by the arrow N in FIG. 16A. As shrimp S travels along path T, the hold-down device 262 with its driven conveyor belt traveling in the direction of arrow N serves to press down on and straighten shrimp S along the shrimp length in order that the true shrimp length L can be computed by sensing device 250.

Figure 21:
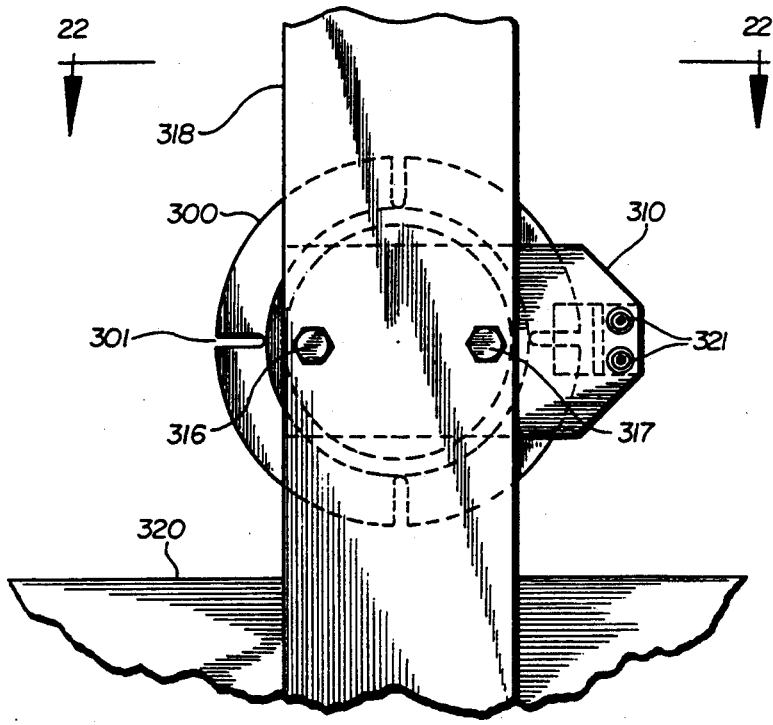
FIG. 21 shows a fragmentary side view of the slotted disc and sensing means for sensing the location of the clamping assemblies on the shrimp transport wheel.
Figure 22:
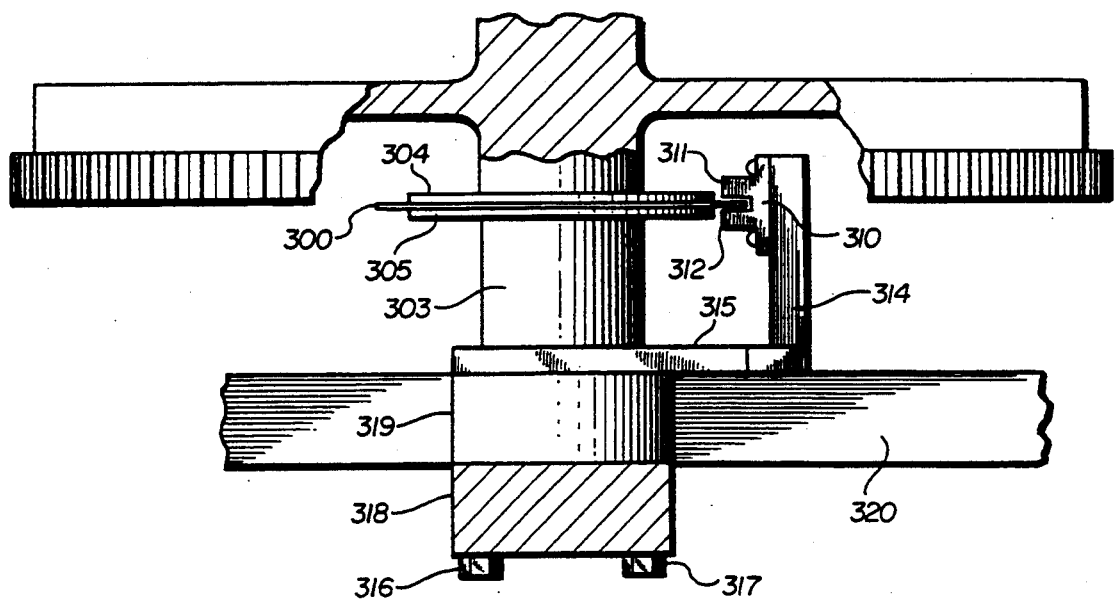
FIG. 22 shows a cross-section view of the slotted disc and sensing means taken along lines 22—22 in FIG. 21.
Figure 27:
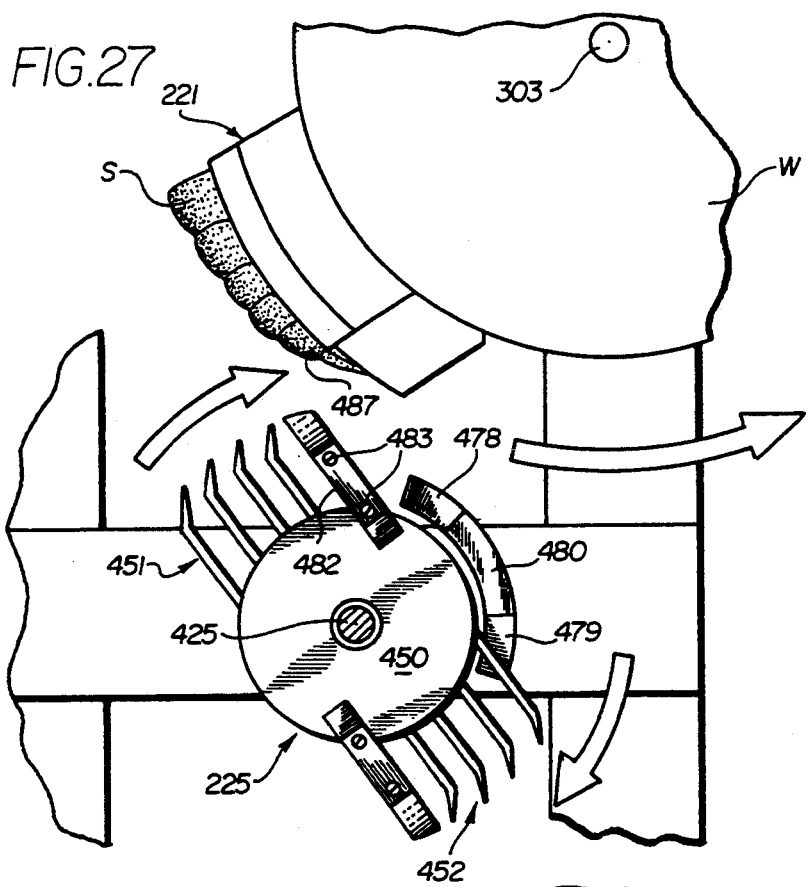
FIGS. 27, 28, 29 and 30 show fragmentary side views of the shrimp meat removal device for removing the shrimp meat from the shrimp shell after a shrimp has been cut and deveined. The rotatable shrimp meat removal device is shown at various stages as it progressively contacts the shrimp on a rotating shrimp clamp assembly to the removal of the shrimp meat from the shrimp shell.

Referring to FIGS. 15, 21 and 22, it will be observed that clamp assembly transport W is adapted to travel at a constant speed in the direction of travel indicated by arrow M (FIG. 15). As wheel W rotates, clamp assemblies 221 are rotated past the shrimp feed conveyor 220 where shrimp S, contacted by the two pairs of conveyors 230, 231, travel along path T which extends along the length of plate 290 toward the shrimp transport wheel W. At the end of plate 290 adjacent transport wheel W, a shrimp S is directed upwardly by the angled abutment 291 (FIGS. 15, 16A) where it is adapted to be engaged by clamp assembly 221.

As discussed previously, it is desired that shrimp S be positioned properly within the clamp assembly whereby the shrimp tail is clamped by the tail clamp portion 292 and the shrimp body is clamped in the body clamp portion 293 of clamp assembly 221. In the embodiment of the invention shown, for example, in FIGS. 15, 21 and 22, disc 300, which has a plurality of spaced slots 301 extending to the edge of the disc, is mounted for rotation with shrimp transport wheel W. FIG. 22 shows disc 300 disposed on drive shaft 303. Plates 304, 305 are secured to the disc in any suitable manner such as welding to provide additional support to the disc. Disc 300 is fixed to and rotates with drive shaft 303. A sensing element 310 having spaced arms 311, 312 is disposed relative to disc 300 such that sensing arm 311 is located on one side of the disc and sensing arm 312 is positioned in alignment with arm 311 but located on the opposite side of disc 300 (FIG. 22). A suitable photoelectric signal is generated between sensing arms 311, 312, the signal being interrupted by disc 300 but for when a slot 301 passes between the sensing arms at which time the detection signal is uninterrupted. Sensing device 310, which can be any desired photoelectric sensor, is connected to arm 314 which, in turn, is joined to bracket 315. Bolts 316, 317 extend through vertical frame support member 318 and mounting sleeve 319, which is located above horizontal frame support member 320. The bolts serve to releasably secure bracket 315 in position on support mender 318. Leads 321 extend from sensing means 310 to the microprocessor.

The spaced slots 301 on disc 300 correspond with the number and location of clamp assemblies 221 on wheel W. Thus, as illustrated in FIG. 15, the four disc slots 301 and the four clamp assemblies 221 are spaced 90° from one another. It is appreciated that if six or eight clamp assemblies were utilized, the number of corresponding slots would be increased, the slots, of course, being positioned to have the same angular spacing as the spacing between clamp assemblies. When a slot passes sensing element 310, a signal will be provided to indicate the relative location of a clamp assembly 221 to shrimp abutment 291 on the feed conveyor 220.

Referring, for example, to FIGS. 15 and 16, as shrimp S pass through feed conveyor 220 in the direction of arrow "T," FIG. 16A, sensor 254 will detect the tail end of a shrimp S and subsequently, sensor 253 will sense or detect the head end of shrimp S as it passes sensor 253. The information sensed by sensor device 250 passes through leads 330 (FIGS. 16A, 19) to microprocessor 155 where the overall length "L" of a shrimp S is computed. The microprocessor then computes a value of 0.42L which represents the location of the interface of the tail section of the shrimp and remainder of the shrimp.

Simultaneously, as shrimp are being fed in the direction of arrow "T" along the length of the conveyor belts 231, 230, the shrimp transport wheel W and clamp assemblies 221 are rotating about shaft 303 in the direction of arrow "M."

Photoelectric sensing element 310 provides a constant beam across the disc 300, the beam being uninterrupted only when a disc slot 301 passes across the beam path. As a clamp assembly 221 reaches a particular location relative to feed plate abutment 291, the beam will be uninterrupted between sensing elements in arms 311, 312, which signal is passed through leads 321 to microprocessor 155 where the relative location between a clamp assembly 221 and a shrimp S on the conveyor feed path is ascertained. It is necessary that the arrival of a shrimp S at the end of the conveyor feed 220 located adjacent the shrimp transport wheel W be synchronized with the arrival of a clamp assembly 221 at the shrimp abutment 291.

The microprocessor 155 translates the information received from the beams 253, 254 and the photoelectric sensing device 310 from which it is computed whether proper synchronization will occur, i.e., whether a shrimp S will be transferred from feed conveyor 220 onto a clamp assembly 221 such that the tail clamp 292 clamps the tail section of the shrimp S and the body clamp 293 clamps the remainder of the shrimp so that the location 0.42L on the shrimp S is at the interface of the tail clamp 292 and body clamp 293. As noted previously, to assure proper shrimp tail section removal, the shrimp must be properly oriented with the tail and body clamps 292, 293.

In some instances, the shrimp will not always be positioned on the feed conveyor 220 to achieve the desired synchronization between a shrimp S and a clamp assembly 221. In the instances where the microprocessor 155 senses and computes the information from sensing device 250 and photoelectric device 310 and ascertain that a shrimp S will arrive too early at the shrimp drop off end of conveyors 320, the microprocessor 155 will issue a command through leads 332 to stop stepper motors 233, 247 for a requisite amount, milliseconds, in order that the shrimp S and a clamp assembly 221 arrive at the drop off end simultaneously.

In the case where a shrimp S will not arrive at the shrimp drop off end of abutment 291 in time to be clamped by a clamp assembly 221, the clamp assembly 221 simply continues to rotate past the shrimp drop off area without receiving a shrimp and the shrimp S then will be deposited on a succeeding clamp assembly 221.

FIGS. 11 and 23 may be referred to as illustrations of the microprocessor components and functions to carry out the second embodiment of the invention disclosed and claimed herein. The following program listings illustrate a program for controlling microprocessor 155 in the above-described operations for this particular embodiment.

```
5 GOSUB 300
8 WAIT.TIME=0.050000
10 RUN.SPEED=798
20 ACCEL.RATE=20000
30 DCL.TRACK.ACL=0
40 MAX.DECEL=20000
50 GO.VEL
60 IF INP1=0 THEN 60
70 INT5=POS.COMMAND
75 PAUSE
80 IF INP3=1 THEN 80
90 INT7=POS.COMMAND−INT5
100 INT8=INT7 * FLT1
110 INT20=INT5+INT8
120 WHILE INT20+417>POS.COMMAND
130 WEND
140 STOP.MOTION
148 PAUSE
150 WHILE INP2=1:WEND
160 WHILE INP2=0:WEND
170 GO.VEL
180 GOT0 60
190 SAVE
200 END
300 INT10=(INP5+(2 * INP6)+
 (4 * INP7)+(8 * INP8))
310 IF INT10=15 THEN FLT1=0.370000
320 IF INT10=14 THEN FLT1=0.380000
330 IF INT10=13 THEN FLT1=0.390000
340 IF INT10=12 THEN FLT1=0.400000
350 IF INT10=11 THEN FLT1=0.410000
360 IF INT10=10 THEN FLT1=0.420000
370 IF INT10=9 THEN FLT1=0.430000
380 IF INT10=8 THEN FLT1=0.440000
390 IF INT10=7 THEN FLT1=0.450000
400 IF INT10=6 THEN FLT1=0.460000
410 PRINT FLT1
420 RETURN
```

While photoelectric cell sensor devices 250 and 310 have been disclosed for the embodiment of FIGS. 13–34 inclusive, it is appreciated that other types sensing means such as light emitting diode sensors, would be satisfactory to provide the desired input from which the proper synchronization between a shrimp S arriving at the desired shrimp drop off end of the feed conveyor 220 along with a clamp assembly 221 could be determined.

Referring to FIGS. 24–26, there is shown a positive driven, shrimp hold-down wheel assembly 222 which serves to press or hold down a shrimp S as a shrimp is grasped by the body and tail clamp portions 292, 293 of clamp assembly 221. Assembly 222 includes a shaft 340 which is fixed in any suitable manner to a vertical machine frame member 341. A dual track pulley 342 having pulley tracks 343, 344, is positioned on a rotatable bearing 345 fixed to shaft 340.

A U-shaped member 346 includes a rectangular bar base 347. Two hollow spaced tubular arms, 348, 349, each having a ball bearing disposed within the tube, extend out from openings in the respective base ends and are fixed to base 347. Tubular arm 348 is positioned for rotation over fixed shaft 347. A first block 350 is fixed to the outboard end of tubular arm 348. A torsion spring 351 having two ends is positioned on shaft 340 adjacent block 350. A second block 352, adjustably fixed to shaft 340, is positioned adjacent spring 351. A dowel pin 353, only one of which is shown in FIG. 25, extends outward from each block 350, 352. One end of torsion spring 351 fastens to dowel pin 353 on first block 350 while the other spring end fastens to the dowel pin 353 on block 352. The spring means serves to bias the U-shaped member 346 so that the bar base 347 is adjustably biased downwardly toward a clamp assembly 221.

Turning to tubular arm 349, a shaft 355 extends through the arm and base 347. A pulley 356 is fixed to one end of shaft 355 while a plastic, V-shaped wheel or roller 222' is fixed to the opposite end of the shaft. Endless belt 357 connects pulley 356 with track 344 in dual track pulley 342.

Figures 33, 34:
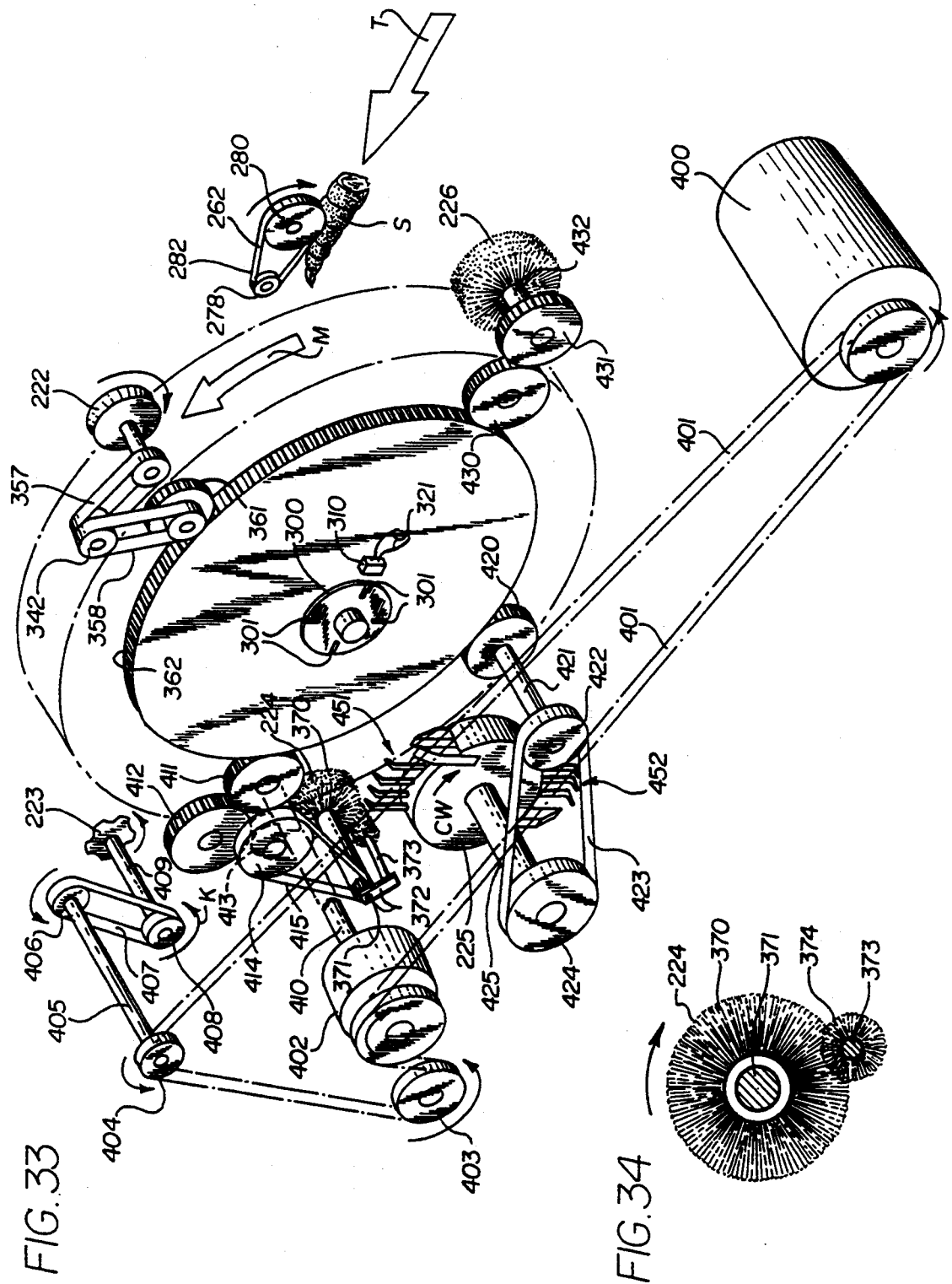
FIG. 33 shows a schematic view of the drive system of the second embodiment of the shrimp peeling machine of the present invention.
FIG. 34 shows a fragmentary, side section view of the dual brush system for deveining shrimp.

As shown in FIGS. 24 and 33, a second endless belt 358 is positioned in pulley track 343 of pulley 342 and connects to pulley 359 attached to shaft 360. Gear 361 which is fixed to shaft 360, is adapted to mesh with the main drive gear 362.

As the main gear 362 is actuated, belt 358 causes pulley 342 to rotate, which, in turn, causes pulley 356 and shaft 355 to rotate thereby causing rotation of holddown wheel 222' in the direction of arrow B while a shrimp travels in the direction of arrow M.

Referring to FIG. 24, a fixed shaft 365 is fixed to bar base 347. An adjustable block 366 having a plurality of various adjusting surfaces 367 is fastened to rotate on shaft 365. Block 366 serves to adjust or limit the amount of travel of bar 346 in a downward direction inasmuch as the block will rest on horizontal fixed frame member 368. By limiting the travel of bar 346, the travel of wheel 222', which is attached to the bar, is also adjusted. As a result, when the block is shown in the vertical position as seen in FIG. 26, wheel 222' will be located in the position shown in solid lines. When block 366 is rotated to the position shown by the phantom lines in FIG. 26, wheel 222' will be moved upwardly to the position illustrated by the phantom lines in FIG. 26.

FIGS. 33 and 34 illustrate the dual layer deveining brush system 224 employed with the present invention. Referring to FIG. 33, a first brush 370 is positioned for contact with the shrimp. This first brush is a conventional brush heretofore used in removing a vein from a shrimp such as shown and described in U.S. Pat. Nos. 4,414,703 and 3,751,766, the entire disclosures and drawings of said '703 and '766 patents being incorporated herein by reference.

Unlike the conventional brush system rotation, however, brush 370 is fixed to rotate on shaft 371 in the direction opposite the direction of rotation of a shrimp on a clamp assembly 221 whereby the brush 370 and shrimp S are traveling in the same direction during the deveining process. A bracket 372 is fixed to and extends downward from shaft 371. A shaft 373 extends outward from bracket 372. A second brush 374, smaller in diameter than the first brush, is mounted for rotation on shaft 373. It will be observed in FIG. 34 that the bristles of the first and second brushes 370, 374 intermesh. It has been found that, in some instances, a shrimp vein will be pulled out of a shrimp by the first brush as the shrimp passes the shrimp deveining station and the first brush contacts the shrimp in the vein region. As the first brush 370 contacts the vein, the vein attaches to the brush bristles and rotates with the first brush. It also will be grasped by the bristles of the second brush 374. What has been found is that the two brushes together serve to provide an improved deveining operation. With the drive arrangement to be described hereinafter, brush 370 rotates clockwise as seen in FIG. 33 so that the ends of the bristles and the shrimp move in the same direction.

The two brushes are conventional brushes available from Gregor Jonsson, Inc., Highland Park, Ill. The catalog number of the large diameter brush 370 is BH-7257 and the small brush catalog number is BH-7262.

Turning to the rotatable shrimp meat removal device 225, the shrimp meat is removed from the outer shell of each shrimp, as best illustrated in FIGS. 27 to 32. The mechanism or device 225 includes a wheel 450 fastened to a central shaft 425 which is suitably rotatably mounted on the frame 490 of the machine. With reference to FIG. 33, and as will be described hereafter, the drive train of the machine turns wheel 450 such that the outer ends of two sets 451 and 452 of tines 453 move in the same direction and at essentially the same speed as shrimp S moving by in a clamp 221. The two tine sets 451 and 452 are attached to wheel 450 and are on diametrically opposite sides of wheel 450.

Each tine set 451 and 452 includes a plurality of tines 453 which extend outwardly from the axis of rotation. In the present specific example, two axially spaced rows (see FIG. 31) of tines 453 are provided, there being four tines in each of the two rows. In each set 451 and 452, one tine 455 extends substantially radially outwardly from the axis of rotation of the wheel 450, one tine 456 is ahead (in the direction of movement) of the tine 455 and two tines 457 and 458 are behind the tine 455. Each of the tines 455 to 458 includes an elongated main portion 459 and an outer end portion 460 which is bent toward the direction of movement at an angle of about 30° relative to the main portion of the tine. The main portions 359 are substantially parallel to each other, and the bent portions 460 are substantially parallel to each other. The outer ends of the tines are sharp and are located substantially in an arc around the axis of rotation of the shaft 425.

Figure 30:
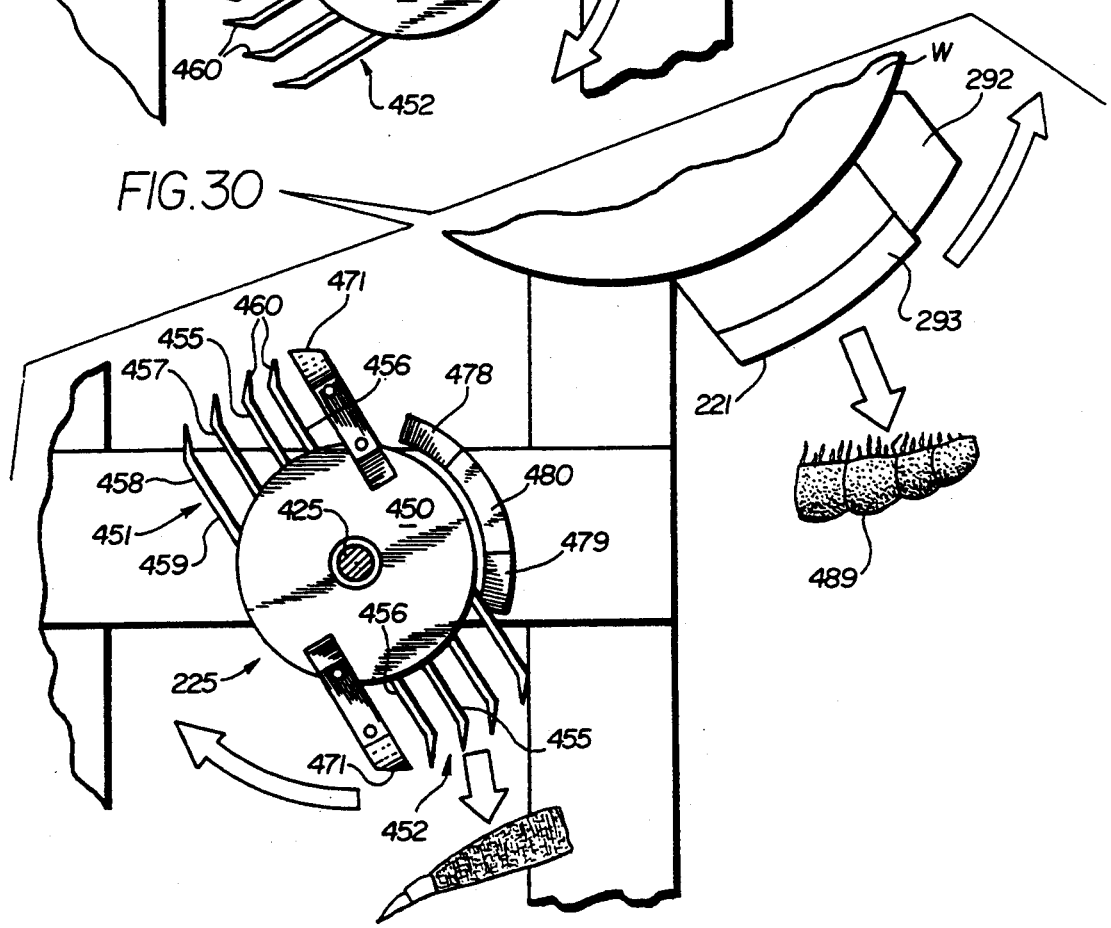
Figure 31:
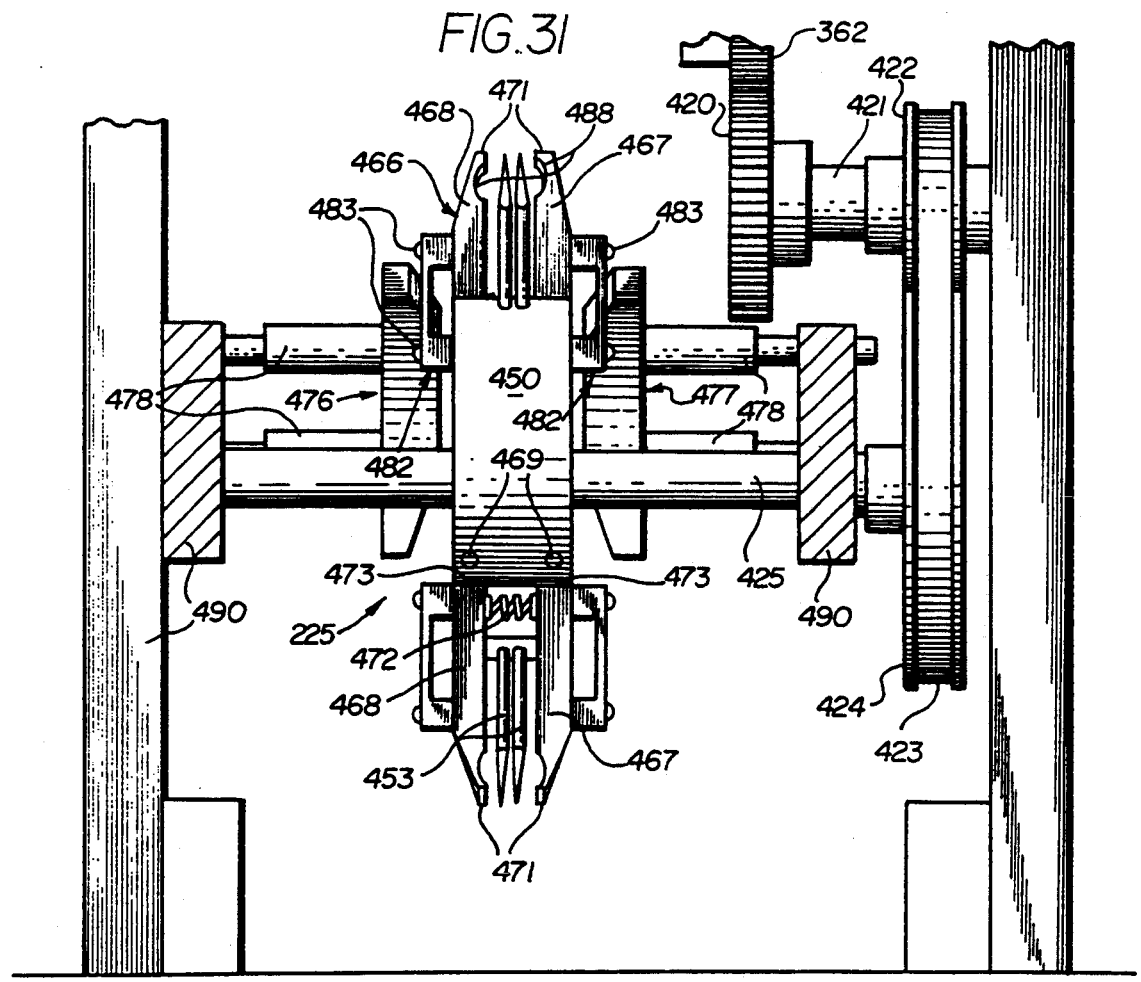
FIG. 31 shows a fragmentary end section view of the meat removal device shown in FIGS. 27-30.

Each set 451 and 452 may optionally include a tail clamp mechanism or device 466 for use when the tail of the shell is to be removed and retained with the shrimp meat. This style of shrimp is commonly referred to as "tail-on shrimp" wherein the tail remains on and is served with the shrimp meat. Each tail clamp assembly 466 comprises two clamp fingers 467 and 468 (see FIGS. 31 and 32) pivotably mounted on the wheel 450 by pivot pins 469. Fingers 467 and 468 extend substantially parallel to the tines of an associated set and, as shown in FIG. 30, for example, the outer ends 471 of the fingers are curved and extend substantially in the same arc as the ends of the tines.

With reference again to FIGS. 31 and 32, between the pivot pins 469 and the outer ends 471 of each pair of fingers is mounted a compression spring 472 which tends to spread or bias apart the outer finger ends. The amount of the spread or openings of the fingers is limited, however, by stop surfaces 473 on the radially inner ends of the fingers which abut stop 473' on wheel 450.

Figure 28:
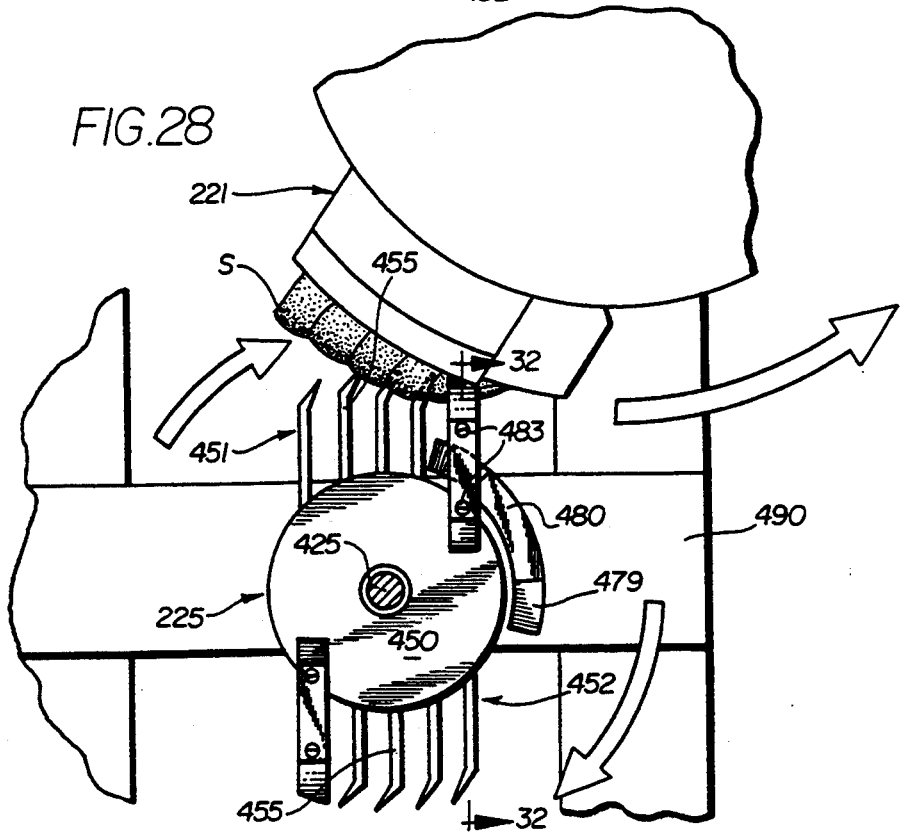
Figure 29:
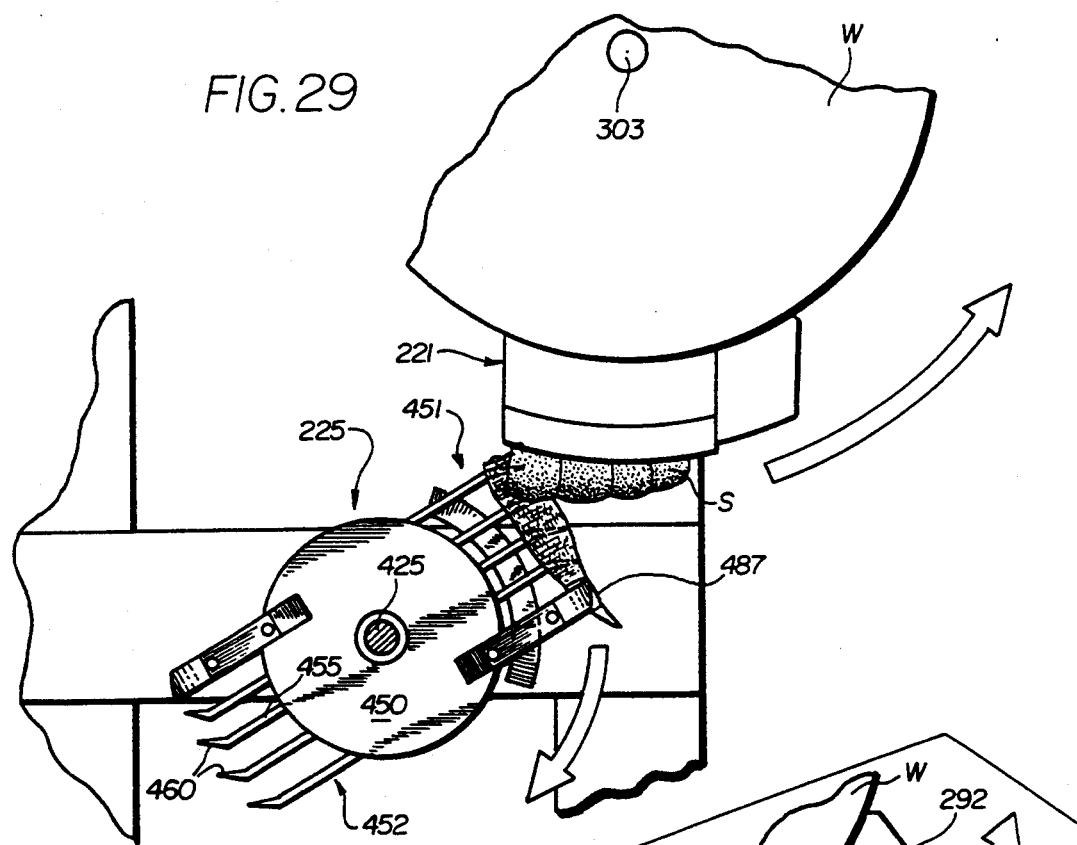
Figure 32:
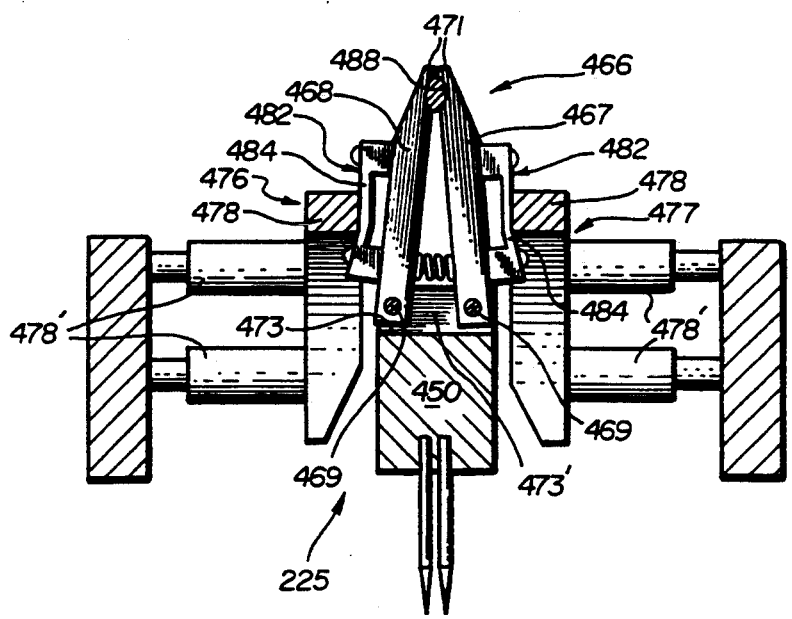
FIG. 32 shows a fragmentary, section view taken along lines 32—32 in FIG. 28.

A cam arrangement is provided for camming the outer ends at the fingers together in order that the fingers pinch a shrimp tail portion as illustrated in FIGS. 28, 29 and 32. Arcuate cams 476 and 477 are mounted to shafts 478' which are fixed to the machine frame 490, on opposite sides of the wheel 450. Cams 476 and 477 have slanted leading and trailing surfaces 478 and 479 and a flat center surface 480. Flexible cam followers 482 are fastened by screws 483 to the axially outer surfaces of the fingers 467 and 468, and the followers include flexible outer walls 484 that are engageable by the cams 476 and 477.

Considering the operation of the removal mechanism 225, with reference first to FIG. 33, the shrimp transport wheel W turns in the "M" direction and the wheel 450 turns in the CW direction. The rates of rotation are such that the outer ends of the fingers 467 and 468 and the tines move at essentially the same speed as a shrimp S held in clamp assembly 221. Further, the timing of rotation is such that the outer ends of the fingers move over the sides of the tail section 487 (FIGS. 27 to 29) just prior to the cam followers 482 engaging cams 476 and 477. The portions 484 of the followers slide along the leading surfaces 478 of the cams and onto the portions 480 of the cams, causing the outer ends of the fingers 467 and 468 to close together and pinch or securely grasp (see FIG. 32) the shrimp tail section 487 and any meat within it. The fingers 467 and 468 preferably have arcuate grooves 488 (FIG. 31) which receive the shrimp tail section 487. Continued rotation of the wheels W and 450 causes the bent outer ends 460 of the tines to embed into the shrimp meat, as seen, for example, in FIGS. 28 and 29. As the wheels continue to rotate, fingers 467 and 468 cooperate with the tines to pull the meat and tail section away from the shrimp shell which is clamped in clamp assembly 221. With reference to FIG. 29, as the shrimp meat is removed from and clear of the shell, cam followers 467 and 468 move off the trailing cam surfaces 479, thereby allowing fingers 467, 468 to open and release the shrimp tail section. When the tines are in the position where they extend generally downwardly as shown in FIG. 30, the meat slides off the ends of the tines due to gravity, and, at about the same time, the clamp assembly 221 on the transport wheel W opens and drops the shell 489. With reference to FIG. 33, the rotating brush 226 sweeps through and cleans the clamp assembly 221. The foregoing procedure is, of course, repeated with each clamp and shrimp.

The fingers 467 and 468 may be easily deactivated, if desired, by removing the screws 483 and the followers 482, so that the tail section is not removed with the meat.

FIG. 33 shows the drive arrangement for the embodiment of FIGS. 13 to 33. Briefly, drive motor 400 is connected by a suitable serpentine belt 401 to a gear reduction box 402 and pulleys 403, 404. Pulley 404 is connected to one end of shaft 405. The opposite end of shaft 405 is connected to pulley 406 which, in turn, is belted connected by belt 407 to pulley 408 located at one end of cutting shaft 409. Cutting knife 223 is attached to the remaining end of shaft 409. By this arrangement, the rotation of the cutting knife 223 is in the direction shown by arrow "K" in FIG. 33. It has been found that by substantially doubling the knife speed to about 3600 RPMs and having the knife rotate in the direction "K," which is opposite to the direction of travel of a shrimp on the shrimp transport wheel W, a clean or smooth cut, as previously discussed herein, is achieved.

Shaft 410 leads away from gear box 402. Gear 411 is attached to shaft 410, gear 411 meshing with main gear 362 which is fixedly attached to the shrimp transport wheel W.

Gear 411 also meshes with gear 412 which, in turn, meshes with gear 413. Gear 413 is seated on a shaft which is connected with pulley 414. Belt 415 connects pulley 414 with shaft 371. As noted previously, brush 224 is mounted on shaft 371.

Gear 420, which also meshes with gear 362, is connected to one end of shaft 421. At the opposite end of shaft 421 is mounted pulley 422. Pulley 422 is connected by endless belt 423 to pulley 424 which is mounted to one end of shaft 425. At the opposite end of shaft 425 is the meat picker wheel assembly 225 which serves to remove the shrimp meat from the shrimp shell.

Gear 430 also meshes with gear 362. Gear 430 meshes with gear 431 which is fixed to one end of shaft 432. At the opposite end of shaft 432 is shell removal and cleaner brush 226 which is rotated and serves to remove a shrimp shell and other debris from a clamp assembly 221 as the clamp assembly passes this particular work station.

Figure 35:
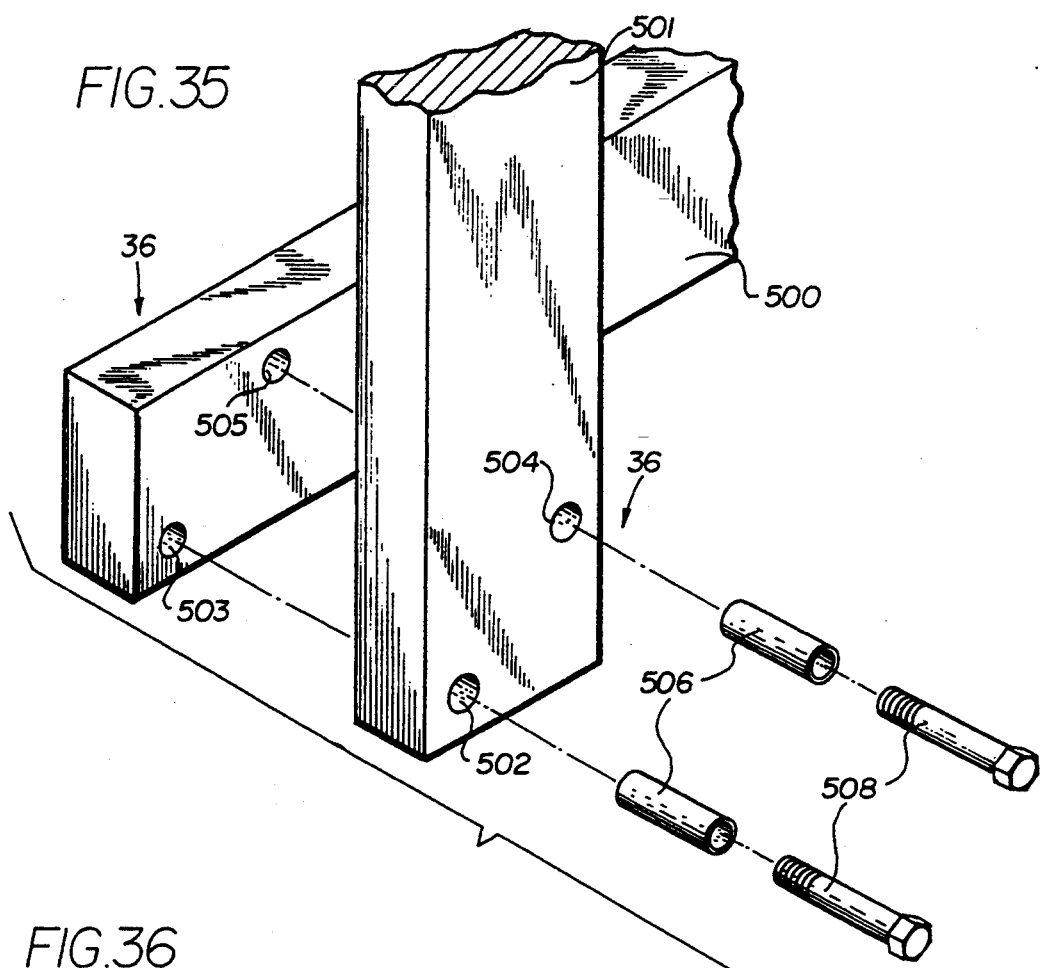
FIG. 35 shows a partial perspective schematic view of the frame construction system used to connect frame support members of the shrimp peeling machine; and, FIG. 36 shows a fragmentary, plan cross-section view taken along lines 36—36 in FIG. 35.
Figure 36:
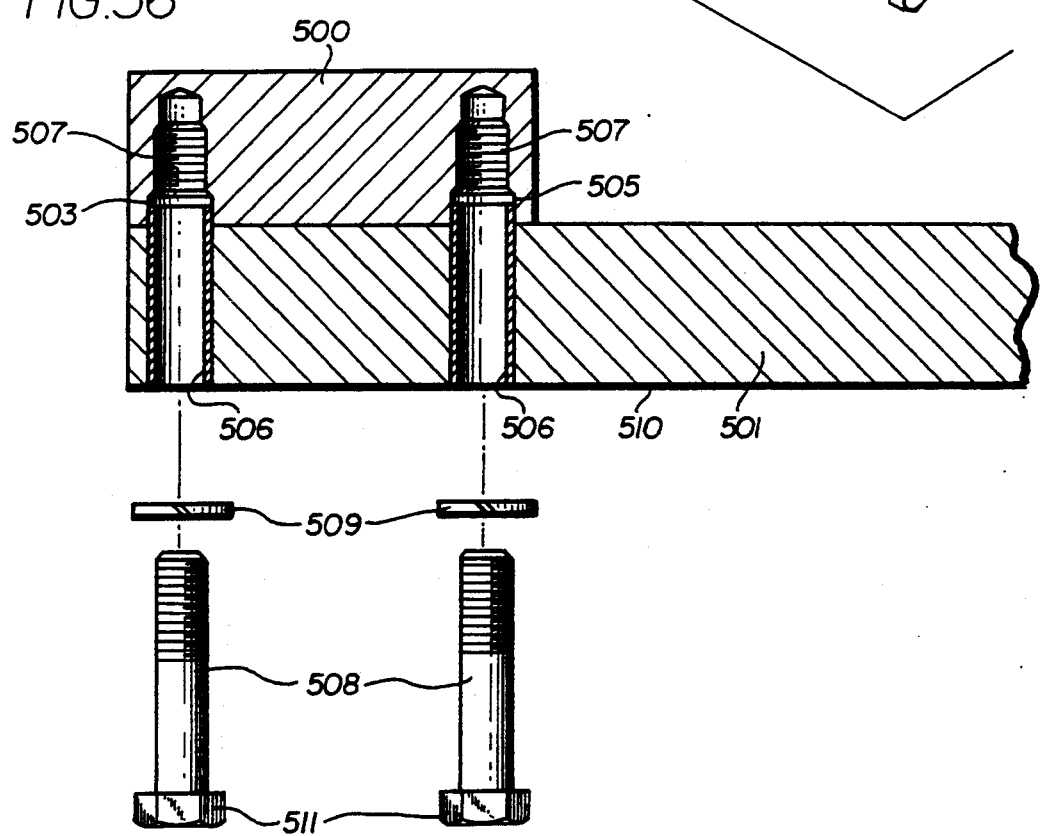

Referring to FIGS. 35 and 36, there are disclosed two illustrative intersecting frame support members 500, 501 which are utilized in constructing the frame for shrimp peeling machine 20 illustrated, for example in FIG. 3. FIG. 3 shows various frame support members, e.g., 23, 24, 25, 26, 27, 28, 29 and 30. It is desired that the frame members be connected together so that the members are properly aligned and also that the frame members will not shift during shipment or use at a customer site. FIG. 35 shows frame members 500 at a right angle to frame member 501. Frame member bore 502 is aligned with frame member bore 503 while frame member bore 504 is aligned with frame member bore 505.

Tubular sleeve 506 is inserted in the aligned openings of bores 502, 503 and bores 504, 505. As shown in FIG. 36, sleeve 506 is slightly longer in length than the thickness of frame member 501. Bore openings 502 and 504 are each slightly larger in diameter than the outer diameter of the sleeve 506 so that sleeve 506 fits snugly within the bore in both frame members 500 and 501. Frame member 500 has a bore diameter extending for a portion of the frame member thickness (FIG. 36) which also is slightly larger than the outer diameter of sleeve 506. Frame member 500 also is drilled and tapped at 507 to accept a conventional fastener such as threaded bolt 508.

As seen more clearly in FIG. 36, tubular sleeve 506 is inserted into and extends through and beyond bore 504 in frame member 501. The sleeve also extends for a portion of the length of bore 505 in frame member 500, the end of the sleeve abutting against the counterbored area in frame member 500. Having the sleeve 506 extend into the two frame members 500, 501, serves to hold the two frame members in alignment thereby assuring precise dimensional stability and preventing any substantial twisting of the joint where the members are joined together.

Following the sleeve insertion, bolt 508 is passed through sleeve 506 and is threaded into the threaded hole at 507 in frame member 500 to secure the joint.

If desired, a conventional lock washer 509 can be utilized in fastening bolt 508 to the frame members, washer 509 being positioned between frame member wall 510 and the bottom side of the bolt head 511. In the assembly of the joint for frame members 500, 501, two frame connections employing two tubular sleeves 506 of the type described herein, are employed. For the shrimp peeling machine of the present invention, the frame members preferably are made of aluminum. Similarly, sleeves 506 also are made of aluminum while the bolts 508 are conventional stainless steel bolts. It is appreciated that other materials could be utilized for the frame member and sleeve construction.

While one or more embodiments of the invention have been herein illustrated and described in detail, it will be understood that modifications and variations thereof may be effected without departing from the spirit of the invention and the scope of the appended claims.

What is claimed is:

1. A shrimp peeling machine comprising a rotatable shrimp transport wheel;
   a plurality of spaced clamp assemblies disposed on said wheel;
   shrimp feed means for feeding shrimp, each shrimp having a tail section and a body section, to said clamp assemblies;
   said feed means being substantially axially aligned with the longitudinal axis of said clamp assemblies;
   means for sensing the location of shrimp on said shrimp feed means; means, acting in response to said sensing means, for delivering said shrimp sensed in said feed means to a clamp assembly whereby said shrimp is properly oriented with respect to said clamp assembly; and,
   means for clamping said shrimp in said clamp assembly.

2. A shrimp peeling machine in accordance with claim 1 wherein each of said clamp assemblies includes a shrimp tail clamp for receiving the tail section of a shrimp and a shrimp body clamp for receiving the body portion of a shrimp; and,
   said synchronizing means including means for synchronizing the depositing of a shrimp from said feed means onto said clamp assembly whereby said shrimp tail section is deposited on said shrimp tail clamp and said shrimp body is deposited on said shrimp body clamp.

3. A shrimp peeling machine in accordance with claim 2 wherein said shrimp feed means includes:
   conveyor means for conveying shrimp from a first shrimp feed location to a second shrimp drop off location where shrimp are deposited on a clamp assembly;
   said conveyor means including means for feeding shrimp along a longitudinal axis of said conveyor means which conveyor means longitudinal axis is substantially aligned with the longitudinal axis of a clamp assembly.

4. A shrimp peeling machine in accordance with claim 3 wherein said shrimp conveyor means includes:
- a pair of endless conveyor belts spaced apart to permit a shrimp to be deposited between and in contact with said belts;
- means for actuating said belts whereby shrimp are delivered from said first position to said second drop off position where a shrimp is deposited on one of said clamp assemblies;
- control means for controlling the delivery of a shrimp on said conveyor means from said first to said second delivery position in timed relation to the arrival of a clamp assembly on said rotatable transport wheel whereby said shrimp is deposited accurately on said clamp assembly.

5. A shrimp peeling machine in accordance with claim 4 where said control means includes:
- a first sensing means for sensing said shrimp as it travels along said conveyor means;
- a second sensing means for sensing the location of a clamp assembly as it travels past said second sensing means.

6. A shrimp peeling machine in accordance with claim 5, said control means includes:
- means for computing the location of said shrimp on said conveyor relative to the location of said clamp assembly, and command means, responsive to said computing means, for interrupting the travel of said shrimp along said conveyor means for a period sufficient to synchronize the delivery of said shrimp to said second position simultaneously with the arrival of said clamp assembly.

7. A shrimp peeling machine in accordance with claim 6 wherein:
- said first sensing means senses the tail end of a shrimp and the end of said body end of a shrimp.

8. A shrimp peeling machine in accordance with claim 7 wherein said first sensing means comprises a laser beam.

9. A shrimp peeling machine in accordance with claim 7 or 8 wherein said computer means computes the length of said shrimp means.

10. A shrimp peeling machine in accordance with claim 9 wherein said clamp assembly includes a shrimp tail clamp section and a shrimp body clamp section;
- said computer means being adapted to compute 0.42 L where L equals the length of a shrimp in said conveyor means; and,
- said synchronizing means synchronizing said shrimp delivery to said clamp assembly whereby said shrimp portion comprising substantially 0.42 L is clamped in said shrimp tail clamp and said remaining portion of said shrimp is substantially clamped to said shrimp body clamp.

11. A shrimp peeling machine in accordance with claim 5 and further including a shrimp hold-down means positioned above said shrimp feed means for contact with said shrimp prior to shrimp reaching said first sensing means.

12. A shrimp peeling machine in accordance with claim 11 wherein said hold-down means comprises a wheel means positioned above a shrimp.

13. A shrimp peeling machine in accordance with claim 11 wherein said hold-down means further includes means for positively driving said wheel means.

14. A shrimp peeling machine in accordance with claim 5 wherein said first sensing means comprising a first detection means for sensing the end of the tail section of a shrimp and a second detection means for detecting the end of said body section of said shrimp.

15. A shrimp peeling machine in accordance with claim 14 and further including means for processing the information sensed by said first and second detection means to ascertain the value of 0.42 L where L is equal to the length of a shrimp.

16. A shrimp peeling machine in accordance with claim 5 and further including means for processing the information sensed by said first sensing means to ascertain the value of 0.42 L where L is equal to the length of a shrimp.

17. A shrimp peeling machine in accordance with claim 14 wherein said first and second detection means each comprise a photoelectric light means.

18. A shrimp peeling machine in accordance with claim 5 wherein said second sensing means comprising a disc adapted to rotate with said rotatable shrimp transport wheel;
- said disc including spaced means thereon wherein each means designates the location of a clamp assembly on said wheel; and,
- a detection source which is adapted to be activated by said spaced means for detecting the location of a clamp assembly.

19. A shrimp peeling machine in accordance with claim 18 wherein said spaced means comprises spaced slots located on said disc and said detection source comprising a light beam which is traversed and interrupted by said disc as it rotates with said rotatable wheel and is uninterrupted by said disc in the region of said slots.

20. A shrimp peeling machine in accordance with claim 1 and further including a shrimp hold-down means located above a clamp assembly at the location where a shrimp from said feed means is adapted to be deposited on said clamp assembly.

21. A shrimp peeling machine in accordance with claim 20 wherein said hold-down means comprises a rotatable wheel.

22. A shrimp peeling machine in accordance with claim 21 where said wheel is positively driven and rotates in the same direction as the direction of travel of a shrimp traveling from said feed means to a clamp assembly.

23. A shrimp peeling machine in accordance with claim 22 and further including means for biasing said wheel in a direction toward a clamp assembly.

24. A shrimp peeling machine in accordance with claim 1 and further including a rotatable shrimp cutting device including a rotatable cutter wheel adapted to cut a shrimp located in said clamp assembly, said cutting device including means to rotate said cutter wheel in a direction opposite the direction of rotation of a shrimp positioned in a clamp assembly on said rotatable shrimp transport wheel.

25. A shrimp peeling machine in accordance with claim 1 and further including means for deveining a shrimp disposed on said clamp assembly;
- said deveining means comprising a first brush means adapted to contact the vein of a shrimp as a shrimp disposed on said clamp assembly rotates past said first brush; and,
- a second brush means adapted to contact said first brush means.

26. A shrimp peeling machine in accordance with claim 25 and further including drive means for rotating said first and second brush means.

27. A shrimp peeling machine in accordance with claim 1 and further including a tray means for depositing shrimp, said tray means being positioned above said feed means.

28. A shrimp peeling machine in accordance with claim 27 and said tray means including an opening therein where shrimp from said tray can be passed through said tray opening and placed on said feed means.

29. A shrimp peeling machine comprising a rotatable shrimp transport wheel;
- a plurality of spaced shrimp clamp assemblies disposed on said wheel;
- shrimp feed means for feeding shrimp, each shrimp having a tail section and a body section, to said clamp assemblies;
- said feed means having an axis which is substantially aligned with the longitudinal axis of said clamp assemblies;
- means for sensing the location of shrimp on said shrimp feed means;
- synchronizing means, acting in response to said sensing means, for delivering said shrimp in said feed means with a clamp assembly whereby said shrimp is properly oriented with respect to said clamp assembly;
- a shrimp hold-down means positioned above said clamping assembly for contacting and maintaining shrimp in position while a shrimp is deposited on said clamp assembly;
- a cutting means for cutting said shrimp including a shrimp cutter wheel and including means for rotating said wheel in the direction opposite the direction of travel of a shrimp in said clamp assembly on said rotatable transport wheel; and,
- a deveining means for deveining said shrimp, said deveining means comprising a first brush means and a second brush means, said brush means each having bristle means which are intermeshed with each other.

30. A shrimp peeling machine in accordance with claim 29 and further including a tray means for depositing shrimp, said tray means being positioned above said feed means.

31. A shrimp peeling machine in accordance with claim 30 and said tray means including an opening therein where shrimp from said tray can be passed through said tray opening and placed on said feed means.

32. A shrimp peeling machine in accordance with claim 29 wherein said feed means comprises at least a pair of spaced conveyors which define a shrimp feed path;
- said feed means being adapted to contact and move said shrimp along said feed path.

33. A shrimp peeling machine in accordance with claim 29 wherein said synchronizing means comprises a first sensing means for sensing the length of a shrimp in said feed means.

34. A shrimp peeling machine in accordance with claim 33 wherein said synchronizing means further includes a second sensing means for sensing the location of a shrimp clamp assembly.

35. A shrimp peeling machine in accordance with claim 29 and further including a hold-down means positioned above said feed means for contacting a shrimp in said feed means prior to said shrimp reaching said synchronizing means.

36. A shrimp peeling machine in accordance with claim 29 and further including a shrimp meat removal means for removing shrimp from a shrimp shell.

37. A shrimp peeling machine in accordance with claim 36 wherein said shrimp meat removal means comprises a rotatable member with a plurality of tines and said removal means is attached to said rotatable wheel;
- means for rotating said member and tines whereby said tines travel in the same direction as a shrimp on a clamp assembly; and,
- said tines being positioned to contact the shrimp meat as said rotatable member and clamp assembly rotate.

38. A shrimp peeling machine in accordance with claim 37 and further including a tail clamping means disposed on said rotatable member for contacting a tail of a shrimp located in said clamp assembly.

39. A shrimp peeling machine in accordance with claim 38 wherein said tail clamping means includes a cam means for actuating said tail clamping means from an open to a closed position.

40. A shrimp peeling machine in accordance with claim 1 wherein said feed means comprises at least one pair of spaced conveyor means for contacting and conveying shrimp along said feed means.

41. A shrimp peeling machine in accordance with claim 40 and further including a shrimp hold-down means disposed above said conveyor means and adapted to contact a shrimp being conveyed along said feed means.

42. A shrimp peeling machine in accordance with claim 40 and further including shrimp hold-down means positioned above a clamp assembly for contact with said shrimp while said shrimp is being transferred to said clamp assembly from said feed means.

43. A shrimp peeling machine in accordance with claim 42 wherein said shrimp hold-down means comprises a rotatable wheel and means for driving said wheel in the same direction of travel of a shrimp being fed to a clamp assembly from said feed means.

44. A shrimp peeling device in accordance with claim 1 and further including means for cutting the shrimp meat and shell of a shrimp located in a clamp assembly, said cutter means including a rotatable cutter member adapted to rotate in a direction opposite the direction of travel of a shrimp in said clamp assembly.

45. A shrimp peeling machine in accordance with claim 44 and further including a first and second brush means for deveining a shrimp cut by said cutting means, said brush means each including bristles which intermesh with each other.

46. A shrimp peeling machine in accordance with claim 45 and further including a shrimp meat removal means for removing shrimp meat from a shrimp shell;
- said removal means comprising a rotatable shrimp removal wheel member; said shrimp removal wheel member being adapted to rotate in a direction opposite the rotatable direction of travel of said shrimp transport wheel;
- said wheel member having a plurality of tines connected to and extending outward from said wheel member;
- said wheel member and tines being positioned relative to a shrimp clamp assembly that said tines are adapted to contact the shrimp meat of a shrimp positioned in said clamp assembly;

said clamp assembly and tines, during the period said tines enter said shrimp meat, traveling in substantially the same direction.

47. A shrimp peeling machine in accordance with claim 46 and further including a shrimp tail section removal device fixed to said shrimp removal wheel member, said tail section removal device comprising a pair of spaced fingers; and, cam means for actuating said fingers from an open position to a closed position.

48. A shrimp peeling machine in accordance with claim 47 where a plurality of tines and tail removal devices are attached to said rotatable shrimp removal wheel member.

49. A shrimp peeling machine in accordance with claims 1 or 29 and further including at least two frame support members for supporting said shrimp transport wheel, said first frame member having an opening therein and said second frame member having an opening and a threaded bore therein being joined together by a joint means comprising:

a sleeve adapted to extend through said opening in first frame member and through said opening in said second frame member;

a bolt adapted to extend through said sleeve, said bolt being threaded in said threaded bore of said second frame member.

50. A shrimp peeling machine in accordance with claims 1, 2, 3, or 29 wherein said machine includes a shrimp cutting means for cutting said shrimp; and means for transporting said clamped shrimp relative to said cutting means.

51. A shrimp peeling machine in accordance with claim 50 wherein said machine includes a shrimp deveining means for deveining shrimp; and means for transporting said clamped shrimp relative to said deveining means.

52. A shrimp peeling machine in accordance with claim 50 wherein said machine further includes a shrimp meat removal means for removing shrimp meat from a shrimp shell, and means for transporting said clamped shrimp relative to said shrimp meat removal means.

* * * * *